(12) United States Patent
Bryll et al.

(10) Patent No.: US 9,060,117 B2
(45) Date of Patent: Jun. 16, 2015

(54) POINTS FROM FOCUS OPERATIONS USING MULTIPLE LIGHT SETTINGS IN A MACHINE VISION SYSTEM

(71) Applicant: Mitutoyo Corporation, Kawasaki-shi, Kanagawa-ken (JP)

(72) Inventors: Robert Kamil Bryll, Bothell, WA (US); Shannon Roy Campbell, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 433 days.

(21) Appl. No.: 13/725,992

(22) Filed: Dec. 21, 2012

(65) Prior Publication Data

US 2013/0162807 A1  Jun. 27, 2013

Related U.S. Application Data

(60) Provisional application No. 61/580,145, filed on Dec. 23, 2011.

(51) Int. Cl.
*H04N 5/232* (2006.01)

(52) U.S. Cl.
CPC .................................. *H04N 5/23212* (2013.01)

(58) Field of Classification Search
None
See application file for complete search history.

(56) References Cited

U.S. PATENT DOCUMENTS

| | | | |
|---|---|---|---|
| 5,488,674 A | 1/1996 | Burt | |
| 5,790,710 A | 8/1998 | Price | |
| 5,828,793 A | 10/1998 | Mann | |
| 6,542,180 B1 | 4/2003 | Wasserman | |
| 6,627,863 B2 | 9/2003 | Wasserman | |
| 7,324,682 B2 * | 1/2008 | Wasserman | 382/145 |

(Continued)

FOREIGN PATENT DOCUMENTS

| | | |
|---|---|---|
| JP | 2003-014433 A2 | 1/2003 |
| JP | 2006-017613 A2 | 1/2006 |
| JP | 2011-153905 A | 8/2011 |

OTHER PUBLICATIONS

Geusebroek, J.-M. and A. Smeulders, "Robust Autofocusing in Microscopy," ISIS Technical Report Series, vol. 17, Intelligent Sensory Information Systems Group, University of Amsterdam, Nov. 2000, 20 pages.

(Continued)

*Primary Examiner* — Jay Patel
*Assistant Examiner* — Reza Aghevli
(74) *Attorney, Agent, or Firm* — Christensen O'Connor Johnson Kindness PLLC

(57) ABSTRACT

A method of automatically adjusting lighting conditions improves the results of points from focus (PFF) 3D reconstruction. Multiple lighting levels are automatically found based on brightness criteria and an image stack is taken at each lighting level. In some embodiments, the number of light levels and their respective light settings may be determined based on trial exposure images acquired at a single global focus height which is a best height for an entire region of interest, rather than the best focus height for just the darkest or brightest image pixels in a region of interest. The results of 3D reconstruction at each selected light level are combined using a Z-height quality metric. In one embodiment, the PFF data point Z-height value that is to be associated with an X-Y location is selected based on that PFF data point having the best corresponding Z-height quality metric value at that X-Y location.

19 Claims, 16 Drawing Sheets

(56) References Cited

U.S. PATENT DOCUMENTS

| | | | |
|---|---|---|---|
| 7,454,053 B2* | 11/2008 | Bryll et al. | 382/152 |
| 7,570,795 B2* | 8/2009 | Yu et al. | 382/141 |
| 7,627,162 B2* | 12/2009 | Blanford et al. | 382/141 |
| 7,653,298 B2 | 1/2010 | Ono | |
| 8,111,905 B2 | 2/2012 | Campbell | |
| 8,111,938 B2 | 2/2012 | Bryll | |
| 2004/0080661 A1 | 4/2004 | Afsenius | |
| 2006/0093205 A1 | 5/2006 | Bryll | |
| 2008/0063294 A1 | 3/2008 | Burt | |
| 2011/0103679 A1* | 5/2011 | Campbell | 382/152 |
| 2011/0133054 A1* | 6/2011 | Campbell | 250/201.2 |

OTHER PUBLICATIONS

"InfiniteFocus," Product Overview, © 2000-2009 Alicona Imaging GmbH Impressum, <http://www.alicona.com/> [retrieved Mar. 6, 2010], 30 pages.

Piper, J., "Image Processing for the Optimization of Dynamic Range and Ultra-High Contrast Amplification in Photomicrography," in A. Mendez-Vilas and J. Diaz (eds.), "Microscopy: Science, Technology, Applications and Education," Formatex Research Center, Badajoz, Spain, 2010, Microscopy Series No. 4, vol. 3, pp. 1436-1444.

"QVPAK 3D CNC Vision Measuring Machine: Operation Guide," Version 2.0, Manual No. 4911GB, Series No. 359, Mitutoyo Corporation & Micro Encoder Inc., Kanagawa, Japan, Sep. 1996, 86 pages.

"QVPAK 3D CNC Vision Measuring Machine: User's Guide," Version 7.1, 2d ed., Manual No. 99MCB225A, Series No. 359, Mitutoyo Corporation & Micro Encoder Inc., Kanagawa, Japan, Sep. 2003, 370 pages.

Socolinsky, D. A., "Dynamic Range Constraints in Image Fusion and Visualization," Proceedings of Signal and Image Processing, Las Vegas, Nev., Nov. 19-23, 2000, 6 pages.

International Search Report and Written Opinion mailed Apr. 30, 2013, in PCT/US2012/071522, filed Dec. 21, 2012, 6 pages.

* cited by examiner

POINTS FROM FOCUS OPERATIONS USING MULTIPLE LIGHT SETTINGS IN A MACHINE VISION SYSTEM

FIELD

The embodiments disclosed herein relate generally to machine vision inspection systems, and more particularly to video tools and methods that provide precise and efficient surface shape inspection using depth from focus operations for non-expert operators.

BACKGROUND

Precision machine vision inspection systems (or "vision systems" for short) can be utilized to obtain precise dimensional measurements of inspected objects and to inspect various other object characteristics. Such systems may include a computer, a camera and optical system, and a precision stage that is movable in multiple directions to allow workpiece inspection. One exemplary prior art system, that can be characterized as a general-purpose "off-line" precision vision system, is the commercially available QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the *QVPAK 3D CNC Vision Measuring Machine User's Guide*, published January 2003, and the *QVPAK 3D CNC Vision Measuring Machine Operation Guide*, published September 1996, each of which is hereby incorporated by reference in their entirety. This type of system is able to use a microscope-type optical system and move the stage so as to provide inspection images of either small or relatively large workpieces at various magnifications.

Machine vision inspection systems generally utilize automated video inspection. U.S. Pat. No. 6,542,180 (the '180 patent) teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user, or through a combination of both methods. Such a recording mode is often referred to as "learn mode" or "training mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools.

Video tools (or "tools" for short) may be used in inspection and/or machine control operations. Video tools are an important and well known operating and programming aid that provide image processing and inspection operations for non-expert users of precision machine vision inspection systems. Video tools are discussed, for example, in the previously incorporated '180 patent, as well as in U.S. Pat. No. 7,627,162, which is hereby incorporated herein by reference in its entirety. During learn mode, their set-up parameters and operation can be determined for specific portions or regions of interest on a representative workpiece, often called "training" the video tool, and recorded for inspecting similar workpieces automatically and reliably. Set-up parameters may typically be configured using various graphical user interface widgets and/or menus of the vision inspection system software. Such tools may include, for example, edge/boundary detection tools, autofocus tools, shape or pattern matching tools, dimension measuring tools, and the like. For example, such tools are routinely used in a variety of commercially available machine vision inspection systems, such as the QUICK VISION® series of vision systems and the associated QVPAK® software, discussed above.

One known type of video tool is a "multipoint tool" or a "multipoint autofocus tool" video tool. Such a tool provides Z-height measurements or coordinates (along the optical axis and focusing axis of the camera system) derived from a "best focus" position for a plurality of subregions at defined X-Y coordinates within a region of interest of the tool, such as determined by an autofocus method. A set of such X, Y, Z coordinates may be referred as point cloud data, or a point cloud, for short. In general, according to prior art autofocus methods and/or tools, the camera moves through a range of positions along a z-axis (the focusing axis) and captures an image at each position (referred to as an image stack). For each captured image, a focus metric is calculated for each subregion based on the image and related to the corresponding position of the camera along the Z-axis at the time that the image was captured. This results in focus curve data for each subregion, which may be referred to simply as a "focus curve" or "autofocus curve." The peak of the focus curve, which corresponds to the best focus position along the z-axis, may be found by fitting a curve to the focus curve data and estimating the peak of the fitted curve. Variations of such autofocus methods are well known in the art. For example, one known method of autofocusing similar to that outlined above is discussed in "Robust Autofocusing in Microscopy," by Jan-Mark Geusebroek and Arnold Smeulders in ISIS Technical Report Series, Vol. 17, November 2000. Another known autofocus method and apparatus is described in U.S. Pat. No. 5,790,710, which is hereby incorporated by reference in its entirety.

Accuracies in the micron or sub-micron range are often desired in precision machine vision inspection systems. This is particularly challenging with regard to Z-height measurements. A particular problem arises when determining a set of Z-height measurements across the surface of a workpiece, as in a multipoint tool. The Z-height accuracy and reliability may be poor for at least some of the data points in a region of interest, for a number of reasons. As a first example, when the surface in the region of interest is strongly curved (e.g., the surface of an IC ball grid array solder ball), some parts of the surface are at an extreme angle of incidence, such that they return little light through the optical system and are underexposed in the autofocus images, whereas other parts of the surface may have a small angle of incidence and be highly reflective such that they return excessive light through the optical system and are overexposed in the autofocus images.

No single image exposure is suitable for all parts of such a region of interest. Underexposed and overexposed subregions exhibit low contrast and/or high image noise. Commonly assigned U.S. Pre-Grant Publication No. 2011/0133054 (the '054 Publication), which is hereby incorporated herein by reference in its entirety, discloses an embodiment of a multi-point tool, and a method for characterizing Z-height measurements (e.g., in point cloud data) which may have poor reliability due to low contrast and/or high image noise.

It is known to overcome the aforementioned problem by providing a plurality of autofocus image stacks, wherein each image stack is acquired using a different exposure level. The best focus position for a particular subregion may then be determined in the particular image stack where that subregion is most properly exposed. One such system is available from Alicona Imaging GmbH, of Grambach/Graz, Austria. However, the Alicona system is a specialized surface mapping system aimed at this particular problem, and it uses special hardware and lighting that may not be available in general purpose precision machine vision inspection systems. Such special purpose systems do not provide a sufficiently versatile solution for determining when to use a plurality of autofocus image stacks having different exposure levels, or for determining specific exposure levels, in the context of programming for a general purpose machine vision inspection system. Conversely, image fusion methods which are known for constructing composite photographs having extended depth of field and extended dynamic range (that is, extended exposure range), are aimed at imaging and not precise Z-height measurement. It is not clear how such methods may be implemented in the context of a video tool that may be reliably operated by a non-expert user to program a general purpose machine vision inspection system for Z-height measurement, nor how they would provide acceptable throughput and reliability for the purpose of industrial measurement applications.

For application to general purpose precision machine vision inspection systems, it is a particular problem that the various multipoint measurement operations and image processing methods incorporated into the system must often be adapted and operated for optimal throughput and reliability based on the characteristics of a particular work piece by non-expert users, that is, users who are not skilled in the field of imaging and/or image processing. Thus, according to the consideration outlined above, there is a need for a multipoint Z-height video tool for a machine vision system which may be comprehended and operated by non-expert users to provide an appropriate number of autofocus image stacks having different exposure levels when necessary, and determines the exposure levels needed, in the context of programming for a general purpose machine vision inspection system.

SUMMARY

This summary is provided to introduce a selection of concepts in a simplified form that are further described below in the Detailed Description. This summary is not intended to define key features of the claimed subject matter, nor is it intended to be used as an aid in determining the scope of the claimed subject matter.

A multipoint video tool based on depth from focus operations is provided for a machine vision system. The multipoint video tool determines Z-height measurements for a plurality of subregions included in a region of interest on a workpiece. The multipoint video tool provides an appropriate number of autofocus image stacks having different exposure levels when necessary, and determines the exposure levels needed, in order to provide a well-exposed image stack for each of a plurality of subregions. The multipoint video tool is supported by simple user interface features configured to be comprehended and operated by non-expert users in the context of programming inspection operations for a general purpose machine vision inspection system, that is users having little or no understanding of the underlying optical, mathematical and/or image processing operations.

A description of one embodiment may include: a method for operating a precision machine vision inspection system to determine a set of multi-point Z-height measurement data comprising focus-based Z-height measurements in a particular region of interest on a workpiece, the precision machine vision inspection system comprising:
  an imaging portion including a camera;
  a controllable lighting portion;
  a focusing portion;
  a control portion comprising an image processor;
  a first measuring mode for performing multi-point focus-based Z-height measurements on a workpiece, comprising operations that determine the multi-point focus-based Z-height measurements for a plurality of subregions within a region of interest based on a single image stack acquired using the same lighting parameters for each image in that image stack;
  a second measuring mode for performing multi-point focus-based Z-height measurements on a workpiece, comprising operations that determine the multi-point focus-based Z-height measurements for a plurality of subregions within a region of interest based on a plurality of image stacks, wherein a first image stack is acquired using darkness limiting lighting parameters that satisfy a darkness limiting criterion for image pixels in the region of interest and that are the same for each image in the first image stack, and a second image stack is acquired using brightness limiting lighting parameters that satisfy a brightness limiting criterion for image pixels in the region of interest and that are the same for each image in the second image stack;
  a user interface including an image display and a graphical user interface (GUI); and
  a multi-point Z-height measurement tool comprising:
    the second measuring mode;
    the brightness limiting criterion for image pixels in the region of interest;
    the darkness limiting criterion for image pixels in the region of interest; and
    a multi-point GUI element including a region of interest indicator; the method comprising:
  performing operations of the machine vision inspection system comprising:
    acquiring an image of the particular region of interest on a workpiece,
    activating an instance of a multi-point Z-height measurement tool, and
    defining a region of interest in the acquired image; and
  performing automatic operations of that instance of the multi-point Z-height measurement tool corresponding to the second measuring mode, comprising:
    (a) operations that automatically focus the imaging portion at a global best focus height for the region of interest, wherein the global best focus height is determined based on an image stack acquired using a preliminary set of lighting parameters and based on a focus metric that is determined based on the entire region of interest;
    (b) operations that analyze images acquired at the global best focus height and adjust the lighting parameters to determine brightness limiting lighting parameters that satisfy the brightness limiting criterion for image pixels in the region of interest, and (c) operations that analyze images acquired at the global best focus height and adjust the lighting parameters to determine darkness limiting lighting parameters that satisfy the darkness limiting criterion for image pixels in the region of interest.

In some embodiments, the method may further comprise: acquiring a plurality of image stacks including the region of interest, that plurality of image stacks comprising at least a first image stack acquired using the determined darkness limiting lighting parameters and a second image stack acquired using the determined brightness limiting lighting parameters; and determining the multi-point focus-based Z-height measurements for each of a plurality of subregions within the region of interest based on the plurality of image stacks. In some embodiments, the plurality of image stacks may comprise one or more additional image stacks acquired using a set of lighting parameters that provide intermediate levels of illumination in comparison to those used for the first and second image stacks. In some embodiments, the plurality of image stacks comprises the image stack acquired using the preliminary set of lighting parameters.

In some embodiments, the method may further comprise the operations that determine the multi-point focus-based Z-height measurements for a plurality of subregions within a region of interest based on a plurality of image stacks, and those operations may comprise for each of the plurality of subregions: determining a Z-height quality metric for that subregion for each of the plurality of image stacks; and determining the focus-based Z-height measurement for that subregion based on the one of the plurality of image stacks that provides the best Z-height quality metric.

In some embodiments, the method may comprise performing at least a portion of the method under the control of part program instructions during a run mode.

In some embodiments, the method may comprise performing at least a portion of the method during a learn mode, and may further comprise recording part program instructions corresponding to a current instance of the multi-point Z-height measurement tool, the part program instructions usable to perform operations comprising: acquiring a plurality of image stacks including the region of interest, that plurality of image stacks comprising at least a first image stack acquired using the determined darkness limiting lighting parameters and a second image stack acquired using the determined brightness limiting lighting parameters; and determining the multi-point focus-based Z-height measurements for each of a plurality of subregions within the region of interest based on the plurality of image stacks, comprising for each subregion: determining a Z-height quality metric for that subregion for each of the plurality of image stacks; and determining the focus-based Z-height measurement for that subregion based on the one of the plurality of image stacks that provides the best Z-height quality metric.

In some embodiments, the method may comprise performing the operations of the machine vision inspection system during a learn mode, wherein: in the step of acquiring an image of the particular region of interest, the workpiece is a representative workpiece and the step comprises displaying the acquired image on the image display; the step of activating an instance of a multi-point Z-height measurement tool comprises displaying its multi-point GUI element in the image display; and the step of defining a region of interest in the acquired image comprises defining a region of interest in the displayed image by positioning the region of interest indicator of the multi-point GUI element to surround the particular region of interest Another description of various embodiments may include: a method for operating a precision machine vision inspection system to determine a set of Z-height measurement data comprising focus-based Z-height measurements on a workpiece, the precision machine vision inspection system comprising a user interface, an imaging portion including a camera, a controllable lighting portion, a focusing portion, and a control portion comprising an image processor, the method comprising:

(a) operating the precision machine vision inspection system to define a region of interest for performing points-from-focus operations on the workpiece;

(b) operating the precision machine vision inspection system to define N respective lighting vectors associated with N image stacks comprising images including the region of interest and having different focus Z-heights in a defined Z-height range, where N is at least 2, and defining the N respective lighting vectors comprises;

(b1) defining a first respective lighting vector such that a first brightness criterion is satisfied wherein the brightest pixel locations in the region of interest include brightness values in the upper 25% of a brightness range of the camera, and such that a first number of the brightest pixel locations in the region of interest which have brightness values at or above an upper brightness limit is limited to a first small proportion of the pixel locations in the region of interest, as determined in at least a first image having a respective focus Z-height in the Z-height range and having an image exposure level corresponding to the first respective lighting vector; and (b2) defining a second respective lighting vector such that a second brightness criterion is satisfied wherein a second number of the darkest pixel locations in the region of interest which have brightness values at or below a lower brightness limit is limited to a second small proportion of the pixel locations in the region of interest, as determined in at least a second image having a respective focus Z-height in the Z-height range and having an image exposure level corresponding to the second respective lighting vector; and (c) performing at least one of the sets of operations (c1) and (c2), wherein:

(c1) comprises:

storing the N respective lighting vectors in association with a part program for later use when inspecting a corresponding region of interest on a corresponding workpiece, wherein the part program includes instructions for performing operations comprising:

acquiring N image stacks based on the N respective lighting vectors; determining which of the N image stacks has the best Z-height quality metric at each points-from-focus data point location; and providing Z-height measurements data derived from the image stacks such that at each points-from-focus data point location the Z-height measurement associated with the image stack having the best Z-height quality metric is identified as the Z-height measurement at that points-from-focus data point location, (c2) comprises:

operating the precision machine vision inspection system to acquire N image stacks based on the N respective lighting vectors;

determine which of the N image stacks has the best Z-height quality metric at each points-from-focus data point location; and providing Z-height measurement data derived from the image stacks such that at each points-from-focus data point location the Z-height measurement is based on the image stack having the best Z-height quality metric at that points-from-focus data point location.

In some embodiments, in step (b1) the first number of the brightest pixel locations in the region of interest which have brightness values at or above an upper brightness limit may be limited to a first small proportion of the pixel locations in the region of interest, as determined in a first plurality of images having respective focus Z-heights in the Z-height range and having an image exposure level corresponding to the first respective lighting vector; and in step (b2) the second number of the darkest pixel locations in the region of interest which have brightness values at or below a lower brightness limit may be limited to a second small proportion of the pixel locations in the region of interest, as determined in a second plurality of images having respective focus Z-heights in the Z-height range and having an image exposure level corresponding to the second respective lighting vector.

In some embodiments, in step (b1) the at least a first image may consist of the first image and in step (b2) the at least a second image may consist of the second image. In some embodiments, the respective focus Z-heights of the first and second images may be different. In some embodiments, the respective focus Z-heights of the first and second images may be the same.

In some embodiments, step (b) may comprise performing operations including: defining the Z-height range; acquiring a preliminary image stack comprising a plurality of images at a plurality of corresponding focus Z-heights in the Z-height range using a preliminary lighting vector; determining a peak focus Z-height based on the preliminary image stack; and using that peak focus Z-height as the respective focus Z-height of the first and second images. In some embodiments, defining the first respective lighting vector may comprise iteratively analyzing respective images acquired at the peak focus Z-height using respective lighting vectors until at least a first respective image is identified that satisfies the first brightness criterion, and using the respective lighting vector corresponding to that at least a first respective image as the first respective lighting vector; and defining the second respective lighting vector may comprise iteratively analyzing respective images acquired at the peak focus Z-height using respective light vectors until at least a second respective image is identified that satisfies the second brightness criterion, and using the respective lighting vector corresponding to that at least a second respective image as the second respective lighting vector.

In some embodiments, the method may be characterized as automatically adjusting lighting conditions to improve the results of focus-based (points from focus or PFF) 3D surface profile reconstruction. In one embodiment, the method adaptively determines a number of image stacks and corresponding light settings to use for data acquisition. The determined number of image stacks and corresponding light settings are recorded in a program that acquires the number of image stacks at the corresponding light settings, and selects the PFF data point value to be associated with an X-Y location based on that PFF data point having the best corresponding Z-height quality metric value among the number of image stacks at that X-Y location. In some embodiments, multiple lighting levels (e.g., at least two, and in some embodiments three lighting levels or more) may be automatically found based on brightness criteria. Multiple image stacks may be acquired (e.g., one at each lighting level) and the results at each selected light level may effectively be combined using a Z-height quality metric to provide the 3D surface profile reconstruction. It will be appreciated that the automatic light adjustment may allow 3D reconstruction of more surface points than a single light setting, particularly when the measured area contains a wide range of surface angles, such as may cause illumination variations that may exceed the dynamic range of the camera.

In one embodiment of another aspect of the invention, in one implementation the method begins by taking a first image stack at a first user selected or standard light setting. The peak focus location is then determined for this image stack. The stage is then moved to the peak focus location. A lower light setting is then determined which produces only a few saturated or "bright" pixels at the peak focus location. A higher light setting is then determined which produces only a few "dark" pixels at the peak focus location. A determination is then made as to whether the difference between the lower light setting and the higher light setting (or between these settings and the initial light setting) is significant. If the differences are significant for each of the lower and higher light settings, then a corresponding image stack is acquired at each of the respective lower and higher light settings, otherwise the initial or a compromise light setting may be utilized.

In one embodiment of another aspect of the invention, in one specific implementation the lower and higher light level settings may be automatically determined so as to minimize the "too bright" and "too dark" surface regions in the respective stacks of images. A determination as to which pixels are classified as being too bright (e.g., oversaturated) or too dark may be made in accordance with which pixels are above or below certain determined gray scale levels. Then, the light level search may be deemed completed when a specified number or percentage of the total number of pixels in the region of interest are at the specified too bright/too dark levels. In one specific example embodiment, the desired "low" lighting level may be selected according to when a specified small percentage of the total number of pixels are too bright, while the desired "high" lighting level may be selected according to when a specified small percentage of the total number of pixels are too dark.

In one embodiment of another aspect of the invention, in one specific example embodiment, the determination of the lower light setting that minimizes the "too bright" surface regions in a stack of images includes defining a first respective lighting vector such that a first brightness criterion is satisfied wherein the brightest pixel locations in the region of interest include brightness values in an upper percentage (e.g., in the upper 25%) of a brightness range of the camera, and such that a first number of the brightest pixel locations in the region of interest which have brightness values at or above an upper brightness limit is limited to a first small proportion (e.g., 0.1%) of the total number of image pixels in the region of interest. For determining the higher light setting that minimizes the number of "too dark" surface regions in the stack of images, a second respective lighting vector is defined such that a second brightness criterion is satisfied wherein a second number of the dark pixel locations in the region of interest which have brightness values at or below a lower brightness limit is limited to a second small proportion (e.g., 0.1%.)

In one embodiment of another aspect of the invention, the determined lower and higher light settings may or may not be saved and stored with the part program depending on their performance. In other words, depending on the lighting conditions, only one or no additional lighting level sets may be used (e.g., the algorithm may not save any additional lighting level sets if the user specified or standard lighting level provides adequate surface illumination such that there are few enough "too bright" or "too dark" pixels.)

In one embodiment of another aspect of the invention, a single image (i.e., corresponding to a representative Z-location) is selected from the preliminary image stack for purposes of determining the desired light levels. In one implementation, a standard sharpness (e.g., contrast) measure may be applied to find the representative image from the preliminary image stack. In this process, the entire region of interest of a multipoint points from focus video tool may be used to compute the measure (as opposed to only a small local region of interest.) In other words, in certain implementations a single image (i.e., a single Z-location that the stage is moved to) may be relied upon to determine how the lighting adjustments change the illumination of the surface. This single "live" camera image at the specified Z-location can then be captured and analyzed repeatedly and rapidly in the adjustment loops of the algorithm.

Many skilled in the art would presume that for reliable results a method for light setting is necessary where focus is firstly set such that only (or at least) the dark portion of an image is well focused in order to adjust the lighting for that dark portion, and secondly set such that only (or at least) the bright portion of an image is well focused in order to adjust the lighting for that bright portion. However, in contrast to such a method, it has been experimentally determined that for a wide variety of industrial workpieces an image acquired at a Z-height that provides with the highest (or nearly highest) overall sharpness or focus measure for a region of interest in an image stack acquired using a nominal level of illumination (e.g., illumination that provides a subjectively "good" image of a region of interest, for example as set by an operator/observer, or a nominal automatically determined light level) tends to be an adequate or even best image for setting both the bright and dark portion light levels. This method is preferred, but not necessarily required in various embodiments. In one alternative embodiment, an image (i.e., a specified Z-height) may be selected with the largest number of "too bright" pixels for the first phase of the adjustment for finding the lower light setting, and an image (i.e., a specified Z-height) with the largest number of "too dark" pixels may be selected for the second phase of the adjustment for finding the higher light setting. However, as indicated above, in certain implementations the results of this dual-image adjustment technique have been experimentally determined to be less favorable than the technique of utilizing a single image (i.e., a single Z-location) with highest high "average" sharpness in the region interest.

In one embodiment of another aspect of the invention, the setting of the light level may comprise multiple settings for multiple individual lights. In one specific example embodiment, the individually adjustable lights may include lights such as the coax, the stage, four segments of a ring light, a ring light position, etc. In another embodiment, for efficiency reasons during the search for the light settings, the lighting adjustments may be limited to a selected number of individual lights (e.g., just the coax and/or the stage, etc.)

In one embodiment of another aspect of the invention, in one embodiment the search for additional light settings may be performed only during a learn mode. This may be done because the search for different light settings may be fairly time consuming (e.g., on the order of a minute), such that they may be inefficient to perform during a run mode. Once the light settings are established during the learn mode, they are stored in a part program and then used during a run mode to capture multiple image stacks without any additional search for new light settings. Thus, the only additional time required during the run mode in such an implementation is the time spent capturing and analyzing the additional image stacks, as opposed to the additional time that would be required for searching for additional light settings during the run mode. It will be appreciated that by thus adaptively determining the number of image stacks and corresponding light settings during a learn mode, and then using those parameters during a run mode, a fast and efficient method is provided. In an alternative embodiment, a dynamic run mode may be implemented under certain circumstances wherein a search for additional light settings may be performed during the run mode. Such an implementation may be used in an effort to improve the accuracy of the run mode results at the cost of the additional time required for performing the search for the additional light settings during the run mode.

In one embodiment of another aspect of the invention, the Z-height quality metric may be utilized for the determination as to which data should be used for the surface reconstruction (i.e., for combining the results of the 3D reconstructions from multiple image stacks captured at varying light settings.) In other words, when multiple image stacks are captured at varying light settings for producing a 3D reconstruction of a surface, for a given pixel (i.e., a given surface location in the X-Y plane), a sharpness curve may be selected according to the one that has a highest Z-height quality metric among the multiple image stacks. Using this feature in combination with the methods of light setting for a plurality of image stacks disclosed herein provides a particular streamlined and fast, yet reliable method of measuring Z-heights in a multi-point video tool disclosed herein.

In one embodiment of another aspect of the invention, in one embodiment the Z-height quality metric may generally be defined as a metric based on a relationship (e.g., a ratio or quotient) between a representative peak height indicated by a focus peak determining data set and a representative noise level or "noise height". In one specific implementation, the Z-height quality metric may be defined as the ratio of the maximum value of the focus peak determining data set (or a curve fit to the focus peak determining data set) minus a baseline value of the focus peak determining data set (or a curve fit to the focus peak determining data set) divided by an estimated noise value of the focus peak determining data set. In certain implementations, the baseline of the focus peak determining data set may be estimated as its median value, wherein most of the values in that set may be near the baseline and normally a relatively small number of values may occur in the region of the focus peak. Such a focus peak determining data set may correspond to an image stack comprising a relatively large number of images (e.g., 100 images) spread over a fairly large Z-height range about the best focus position, for example. In certain implementations, the estimated noise value may be determined as the median absolute difference from the median of the focus peak determining data set.

In one embodiment of another aspect of the invention, in one specific example implementation, the specific equation for calculating the Z-height quality metric may have a numerator that comprises a maximum contrast value minus a baseline contrast value which is the median of all of the contrast values in the respective contrast curve. The denominator of the equation may comprise the median of the absolute deviation of the difference between all of the contrast values of the contrast curve and the baseline contrast value. It will be appreciated that in this equation, in general the denominator estimates the noisiness of the curve. Large noise (i.e., a large median absolute deviation from the baseline) indicates a lower focus quality.

In one embodiment of another aspect of the invention, while the various lighted image stacks could be combined/selected based on a brightness criterion, the utilization of a Z-height quality metric as the combining/selecting criteria provide superior results in certain implementations. One noted advantage of utilizing a Z-height quality metric as the criterion is that selecting the light levels is made to be more forgiving, in that that using a Z-height quality metric as the basis for selection is generally more comprehensive and more relevant and more robust than using a brightness criterion for the selection. In addition, certain focus quality meta-data can also be stored and utilized for later applications.

In some embodiments, a multi-point Z-height measurement tool that operates in a mode that provides multi-point Z-height measurements based on providing multiple image stacks having lighting and analysis based on the teachings disclosed herein may also be operated in a mode that provides previously known operations wherein a single image stack and a single light setting is used to provide multi-point Z-height measurements. The mode may be selected using GUI elements associated with the multi-point Z-height measurement tool. In some embodiments, a user may determine whether a multi-point Z-height measurement tool operates in a mode emphasizing "higher accuracy" (e.g., where image stacks may be provided that have more optimal lighting in some subregions, at the expense of data acquisition and/or execution time), or in mode emphasizing "higher speed" (e.g., where image stacks may be provided that provide less optimal lighting in some subregions, to reduce data acquisition and/or execution time).

BRIEF DESCRIPTION OF THE DRAWINGS

The foregoing aspects and many of the attendant advantages of the embodiments disclosed herein will become more readily appreciated as the same become better understood by reference to the following detailed description, when taken in conjunction with the accompanying drawings, wherein.

DETAILED DESCRIPTION

Figure 1:
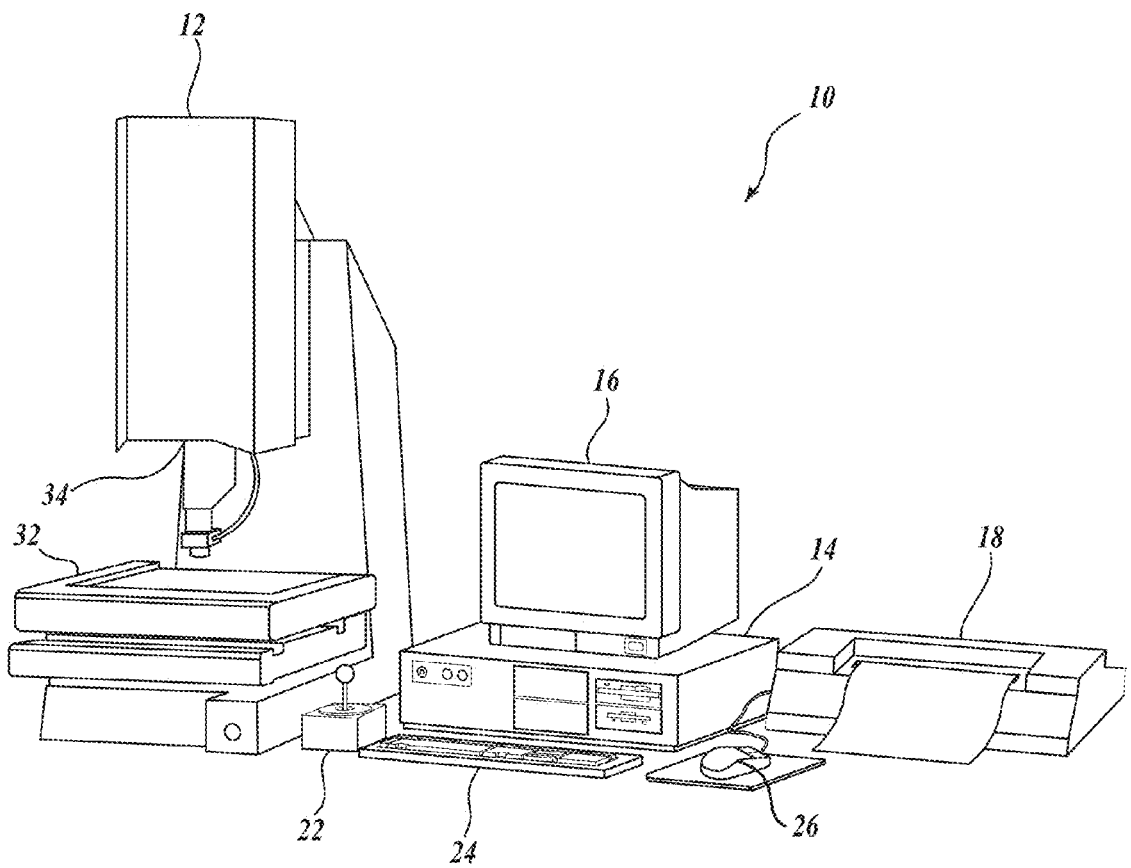
FIG. 1 is a diagram showing various typical components of a general purpose precision machine vision inspection system.

FIG. 1 is a block diagram of one exemplary machine vision inspection system 10 usable in one embodiment. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10.

The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in commonly assigned U.S. Pat. No. 7,454,053, and in copending and commonly assigned U.S. Pat. No. 8,111,938, filed Dec. 23, 2008, which are each hereby incorporated herein by reference in their entireties. Various aspects of vision measuring machines and control systems are also described in more detail in copending and commonly assigned U.S. Pre-Grant Publication No. 2005/0031191, filed Aug. 4, 2003, and U.S. Pat. No. 7,324,682, filed Mar. 25, 2004, which are also each hereby incorporated herein by reference in their entireties.

Figure 2:
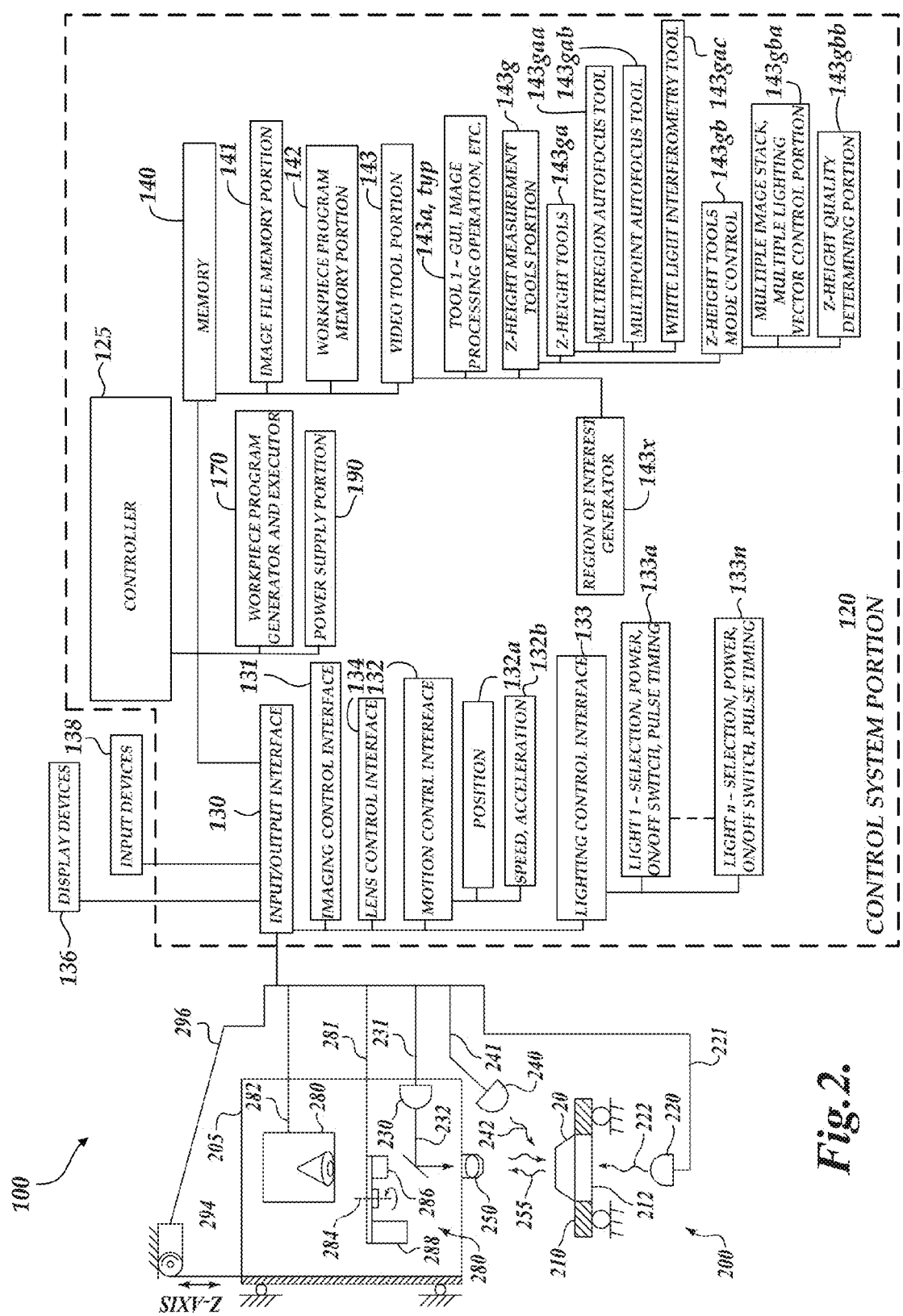
FIG. 2 is a block diagram of a control system portion and a vision components portion of a machine vision inspection system.

FIG. 2 is a block diagram of a control system portion 120 and a vision components portion 200 of a machine vision inspection system 100 in one embodiment. As will be described in more detail below, the control system portion 120 is utilized to control the vision components portion 200. The vision components portion 200 includes an optical assembly portion 205, light sources 220, 230 and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280 having lenses 286 and 288, and the coaxial light source 230. Alternatively to the turret lens assembly, a fixed or manually interchangeable magnification-altering lens, or a zoom lens configuration, or the like, may be included. The optical assembly portion 205 is controllably movable along a Z-axis that is generally orthogonal to the X and Y axes, by using a controllable motor 294, as described further below.

A workpiece 20 that is to be imaged using the machine vision inspection system 100 is placed on the workpiece stage 210. One or more of a stage light 220, a coaxial light 230, and a surface light 240 may emit source light 222, 232, or 242, respectively, to illuminate the workpiece 20. The source light is reflected or transmitted as workpiece light 255, which passes through the interchangeable objective lens 250 and the turret lens assembly 280 and is gathered by the camera system 260. The image of the workpiece 20, captured by the camera system 260, is output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284, to select a turret lens, through a signal line or bus 281.

In various exemplary embodiments, the optical assembly portion 205 is movable in the vertical Z-axis direction relative to the workpiece stage 210 using a controllable motor 294 that drives an actuator, a connecting cable, or the like, to move the optical assembly portion 205 along the Z-axis to change the focus of the image of the workpiece 20 captured by the camera system 260. The term Z-axis, as used herein, refers to the axis that is intended to be used for focusing the image obtained by the optical assembly portion 205. The controllable motor 294, when used, is connected to the input/output interface 130 via a signal line 296.

As shown in FIG. 2, in various exemplary embodiments, the control system portion 120 includes a controller 125, an input/output interface 130, a memory 140, a workpiece program generator and executor 170, and a power supply portion 190. Each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 may include a position control element 132a, and a speed/acceleration control element 132b. However, it should be appreciated that in various exemplary embodiments, such elements may be merged and/or indistinguishable. The lighting control interface 133 includes lighting control elements 133a-133n, which control, for example, the selection, power, on/off switch, and strobe pulse timing if applicable, for the various corresponding light sources of the machine vision inspection system 100.

The memory 140 includes an image file memory portion 141, a workpiece program memory portion 142 that may include one or more part programs, or the like, and a video tool portion 143. The video tool portion 143 includes tool portion 143a, and other similar tool portions, which determine the GUI, image processing operation, etc., for each of the corresponding tools. The video tool portion 143 also includes a region of interest generator 143x that supports automatic, semi-automatic and/or manual operations that define various ROIs that are operable in various video tools included in the video tool portion 143.

The video tool portion 143 also includes Z-height measurement tools portion 143g, which provides various operations and features related to Z-height measurement operations, as described in greater detail below. In one embodiment, the Z-height measurement tools portion 143g may include Z-height tools 143ga and Z-height tools mode control 143gb. The Z-height tools 143ga may include a multiregion autofocus tool 143gaa, a multipoint autofocus tool 143gab, and a white light interferometry tool 143gac. The Z-height tools mode control 143gb may include a multiple image stack and multiple lighting vector control portion 143gba and a Z-height quality determining portion 143gbb.

Briefly, the Z-height measurement tools portion 143g may perform at least some operations similarly to known Z-height measurement tools, for example, performing operations in learn mode and run mode for generating all or part of a focus curve, and finding its peak as a best focus position. Additional Z-height measurement tool operations which are the subject of this disclosure are described in greater detail below.

As will be described in more detail below, the multiple image stack and multiple lighting vector control portion 143gba operates in one embodiment wherein multiple image stacks that are taken with multiple lighting vectors are utilized to increase the accuracy of the reconstruction of a measured surface. In one embodiment, multiple lighting levels (e.g., two, three, or more lighting levels) are automatically found based on brightness criteria and the results of 3D construction at each selected light level (e.g., up to three image stacks) are effectively combined using a Z-height quality metric. The Z-height quality metric is determined by the Z-height quality determining portion 143gbb, and may be defined for a specific region of interest. In some embodiments, a region or subregion of interest may comprise a small set of pixels defined to correspond to, or represent, individual pixel locations.

Alternative configurations are also possible for the Z-height measurement tools portion 143g. For example, the Z-height tools 143ga may provide additional Z-height measurement tool elements, and the mode control portion 143gb may provide operations that govern the user interface and interrelationships of the Z-height measurement tool elements in a manner that depends on which tool behavior is desired. More generally, the embodiments disclosed herein may be implemented in any now known or later-developed form that is operable in conjunction with the machine vision inspection system 100 to provide the features disclosed herein in relation to the Z-height measurement operations.

In general, the memory portion 140 stores data usable to operate the vision system components portion 200 to capture or acquire an image of the workpiece 20 such that the acquired image of the workpiece 20 has desired image characteristics. The memory portion 140 may also store inspection result data, further may store data usable to operate the machine vision inspection system 100 to perform various inspection and measurement operations on the acquired images (e.g., implemented, in part, as video tools), either manually or automatically, and to output the results through the input/output interface 130. The memory portion 140 may also contain data defining a graphical user interface operable through the input/output interface 130.

The signal lines or busses 221, 231 and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 and one or more input devices 138 can also be connected to the input/output interface 130. The display devices 136 and input devices 138 can be used to display a user interface, which may include various graphical user interface (GUI) features that are usable to perform inspection operations, and/or to create and/or modify part programs, to view the images captured by the camera system 260, and/or to directly control the vision system components portion 200. In a fully automated system having a predefined part program (or workpiece program), the display devices 136 and/or the input devices 138 may be omitted.

In various exemplary embodiments, when a user utilizes the machine vision inspection system 100 to create a part program for the workpiece 20, the user generates part program instructions either by explicitly coding the instructions automatically, semi-automatically, or manually, using a workpiece programming language, or by generating the instructions by operating the machine vision inspection system 100 in a learn mode to provide a desired image acquisition training sequence. For example a training sequence may comprise positioning a workpiece feature in the field of view (FOV), setting light levels, focusing or autofocusing, acquiring an image, and providing an inspection training sequence applied to the image (e.g., using video tools.) The learn mode operates such that the sequence(s) are captured and converted to corresponding part program instructions. These instructions, when the part program is executed, will cause the machine vision inspection system to reproduce the trained image acquisition and inspection operation to automatically inspect a workpiece or workpieces matching the workpiece used when creating the part program.

These analysis and inspection methods that are used to inspect features in a workpiece image are typically embodied in various video tools included in the video tool portion 143 of the memory 140, including the Z-height measurement tools portion 143g. Many known video tools, or "tools" for short, are included in commercially available machine vision inspection systems, such as the QUICK VISION® series of vision systems and the associated QVPAK® software, discussed above.

As outlined previously and described in more detail below, Z-height measurement tools such as Z-height tools 143ga typically acquire a series of images and develop focus curves as part of a process for determining a "best focus" position. By utilizing the methods which utilize the multiple image stack and multiple lighting vector control portion 143gba and the Z-height quality determining portion 143gbb, more accurate Z-height measurements for points from focus (PFF) operations and surface reconstructions can be achieved.

Figure 3:
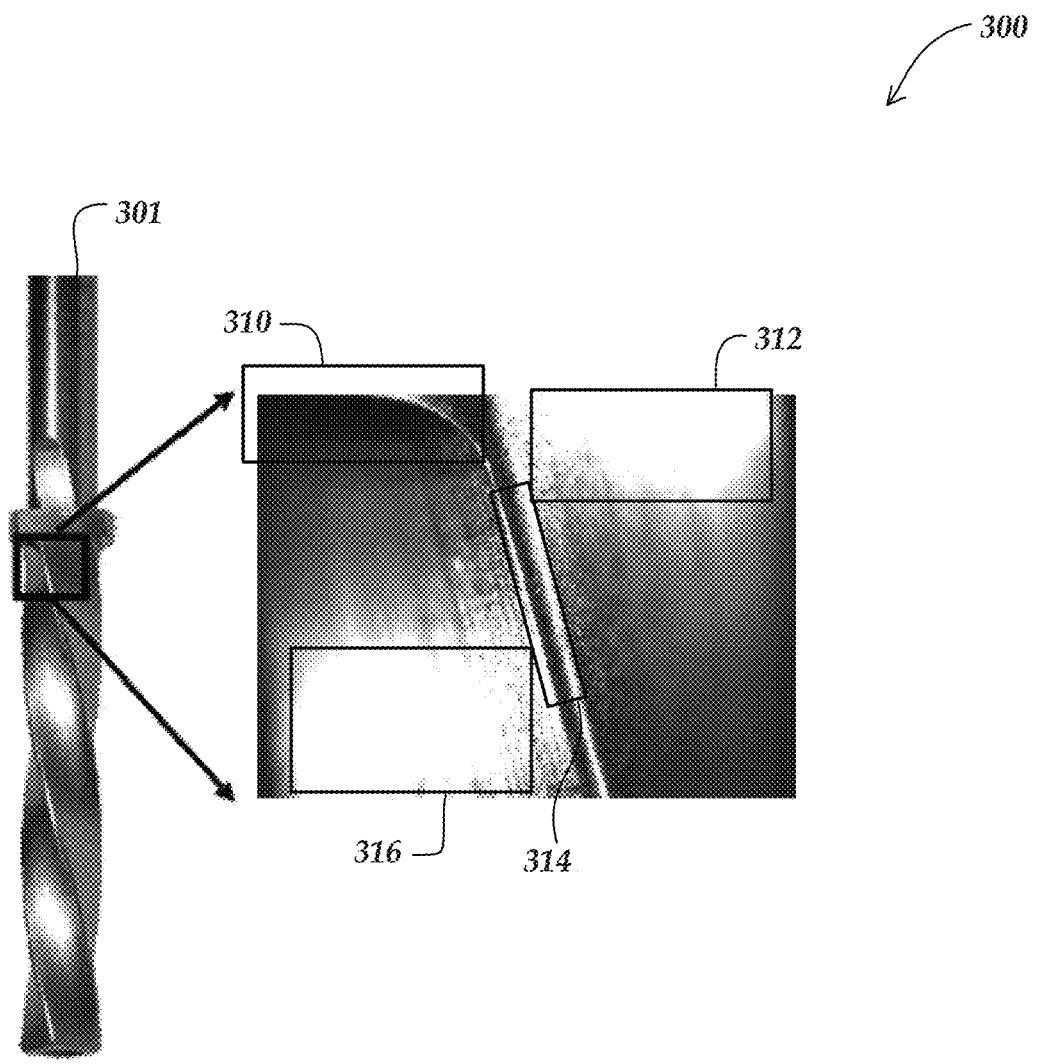
FIG. 3 is a diagram of an image of a surface of a complex object taken with a single light setting.

FIG. 3 is a diagram of an image 300 of a surface of a complex object 301 (e.g., a medical drill bit) taken with a single light setting. As will be described in more detail below, it has been determined that in certain instances a single light setting may be insufficient for imaging operations for reconstructing an accurate representation of a complex surface. This is particularly true when the measured surface contains a wide range of surface angles, causing illumination variations that may exceed the dynamic range of a given camera. As illustrated in FIG. 3, when a single light setting is used during reconstruction of the surface of the complex object 301, an image of the central area 314 of FIG. 3 may not be oversaturated and thus the area 314 may be used for reconstruction of the surface, but the reconstructed surface may have missing areas (e.g., area 310 which is too dark, and areas 312 and 316 which are too bright).

In other words, due to the complex shape of the object 301, the lighting level varies widely on the surface. This results in a lack of contrast in very dark areas (e.g., area 310) and in very bright (oversaturated) areas (e.g., areas 312 and 316). The lack of contrast makes it difficult to reliably reconstruct the surface in these locations. In some instances, the lack of contrast may be due to the variability of illumination exceeding the dynamic range of the camera. In one embodiment, the determination as to whether the contrast is too low to allow certain areas of the surface to be reliably reconstructed may be made in accordance with a Z-height quality metric, such as will be described in more detail below with respect to FIGS. 5A and 5B.

Figure 4:
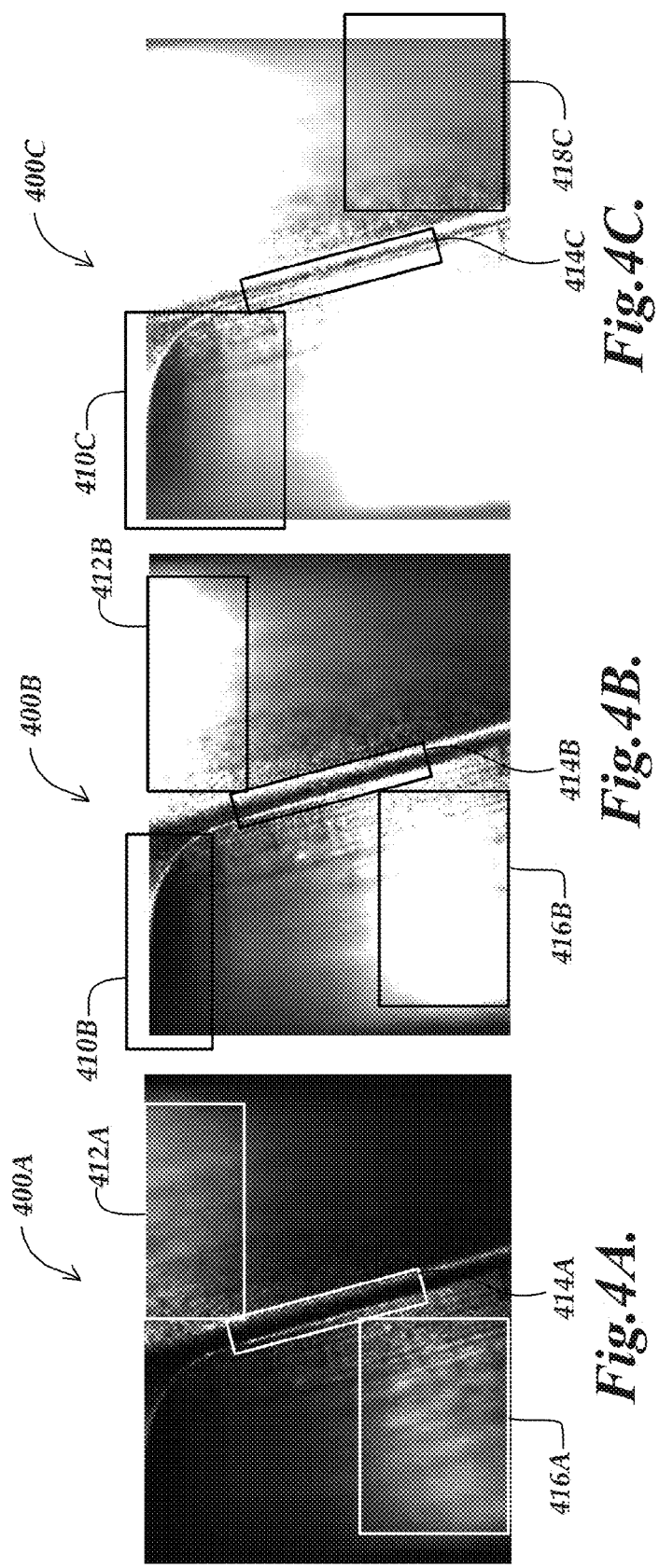
FIGS. 4A-4C are diagrams of images of the surface of the complex object of FIG. 3 taken with varying light settings.

FIGS. 4A-4C are diagrams of images of the surface of the complex object 301 of FIG. 3 taken with three different light settings. As shown in FIG. 4A, a relatively low light setting is utilized (e.g., a light setting wherein relatively few pixels in the image are oversaturated). As will be described in more detail below, in certain embodiments such a low light setting may be selected in accordance with certain specified criteria (e.g., limiting the number of bright pixels in the image that are in the upper 25% of a brightness range of the camera to a relatively small proportion of the total number of pixels in the region of interest, such as 0.1%). As a result of the relatively low light setting illustrated in FIG. 4A, areas that might otherwise have oversaturated pixels at a more standard lighting level (e.g., correspondingly angled and highly reflective areas 412A and 416A) are illustrated as being within the dynamic range of the camera, and thus result in image portions from which the surface may be more reliably reconstructed in those areas.

FIG. 4B illustrates a mid-range light setting (e.g., such as may correspond to the lighting level of FIG. 3, or a user selected or "standard" lighting level, etc.) As described above with respect to FIG. 3, the areas 412B and 416B illustrate pixels that are oversaturated in which the illumination has exceeded the dynamic range of the camera. However, the central area 414B of FIG. 4B is shown to not be oversaturated, and thus can be utilized for accurate reconstruction of the surface in that area. FIG. 4B also shows an area 410B which is still too dark for meaningful surface reconstruction.

FIG. 4C illustrates a relatively high light setting (e.g., one in which there are very few dark areas). As will be described in more detail below, in one embodiment the light setting of FIG. 4C may be selected according to certain specified criteria (e.g., defining a lighting vector such that the number of dark pixel locations in the region of interest which have brightness values at or below a lower brightness limit is limited to a small proportion of the total pixel locations in the region of interest, such as 0.1%). As shown in FIG. 4C, an area 410C and an area 418C, both of which were generally previously too dark in FIGS. 4A and 4B, are now shown to have sufficient contrast so as to allow for more reliable surface reconstruction in those areas.

As described above with respect to FIGS. 4A-4C, for an object with a complex surface structure (e.g., such as medical drill bit 301), it may be difficult to determine a single lighting level that will sufficiently illuminate all of the object's surface areas such that reliable surface reconstruction can be achieved. As will be described in more detail below, in one embodiment multiple image stacks may be taken at different lighting levels, such that a series of images may be produced from which different portions may be taken for more reliably reconstructing the surface of the object. For example, by utilizing different portions of the images from FIGS. 4A-4C (e.g., areas 412A and 416A from FIG. 4A, area 414B from FIG. 4B, and areas 410C and 418C from FIG. 4C), a more reliable reconstruction of the surface of the object 301 may be produced. As will be described in more detail below with respect to FIGS. 5A and 5B, in one embodiment, the determination of which data to utilize from which images, as well as the determination as to whether the contrast is too low in certain areas in any of the images for reliable surface reconstruction, may be made in accordance with a Z-height quality metric.

In general, as will be described in more detail below, the various embodiments disclosed herein provide a simple automated solution that reduces unwanted missing areas on surfaces that may have a large variability of lighting characteristics. Multiple image stacks may be captured (e.g., in one embodiment up to three image stacks may be utilized), with each image stack being taken at a different light setting. The 3D reconstruction results for all of the captured image stacks are then combined using a Z-height quality metric to produce a single higher quality reconstruction. In this manner, few or no missing areas may result in the reconstructed surface, despite the wide range of surface angles and reflectivity in the surface of the object.

In one embodiment, the search for additional light settings may be performed only during a learn mode. This may be done because the search for different light settings may be fairly time consuming (e.g., on the order of a minute), such that it may be inefficient to perform during a run mode. Once the light levels are established during the learn mode, they are stored in a part program and then used during a run mode to capture multiple image stacks without any additional search for new lighting settings. Thus, the only additional time required during the run mode is the time spent capturing and analyzing the additional image stacks, as opposed to the additional time that would be required for searching for additional light settings during the run mode. However, when desired, a dynamic run mode may also be utilized, wherein additional light level searching is performed during the run mode. This type of dynamic run mode may be utilized in cases where the sacrifice in speed is determined to be worthwhile with respect to the resulting increase in accuracy of the run mode results.

Figure 5:
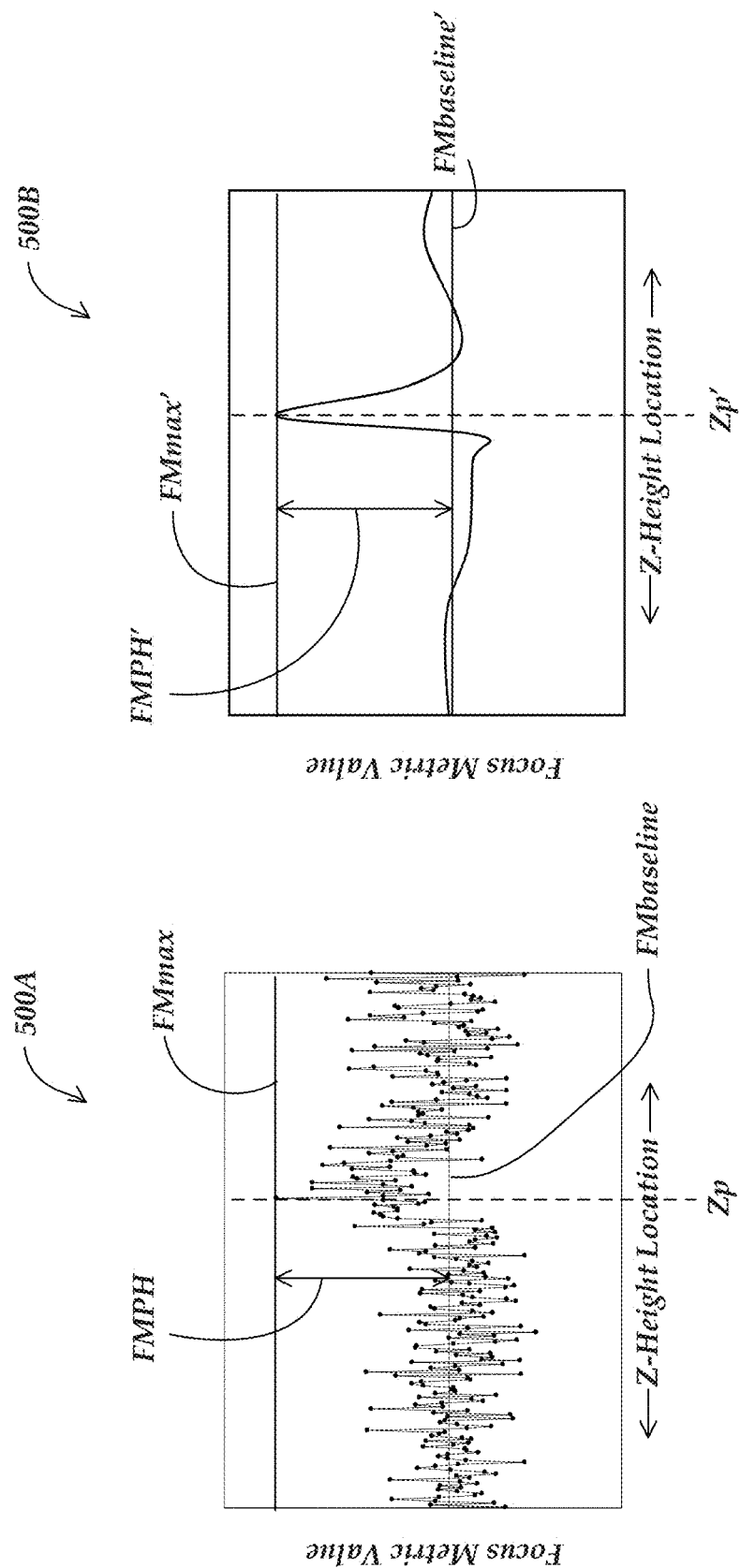
FIGS. 5A and 5B are graphs illustrating curves representative of low and high focus quality values, respectively.

FIGS. 5A and 5B are diagrams of graphs 500A and 500B illustrating representative curves with low and high Z-height quality metrics, respectively. The graphs 500A and 500B include focus curve data which is related to a Z-height quality metric Q by EQUATION 1:

$$Q = \frac{(MAX - BAS)}{\text{Median}\{|C_i - BAS|\}} \quad \text{(Eq. 1)}$$

In EQUATION 1, a contrast-related metric value comprises a Z-height quality metric Q based on a set of focus curve data comprising contrast values vs. Z-heights for each X-Y location in a respective stack of workpiece images (as will be described in more detail below with respect to FIG. 6.) The variables in EQUATION 1 include in the numerator a maximum contrast value MAX minus a baseline contrast value BAS which may be the median of all of the contrast values in the respective contrast curve, and in the denominator the median of the absolute deviation of the difference between the ith contrast values $C_i$ of the contrast curve and the baseline contrast value BAS.

It will be appreciated that in general the denominator of EQUATION 1 estimates the noisiness of the curve. Large noise (i.e., a large median absolute deviation from the baseline) results in lower focus quality. For example, the graph 500A of FIG. 5A is relatively noisy and therefore has a high denominator (i.e., a large median absolute deviation from the focus metric value baseline FMbaseline), for which the calculated Z-height quality metric Q is relatively low. In contrast, the graph 500B of FIG. 5B illustrates a curve with relatively less noise which results in a relatively lower denominator (i.e., a small median absolute deviation from the focus metric value baseline FMbaseline) for which the calculated Z-height quality metric Q is relatively high. In graphs 500A and 500B, in some cases the focus metric maximum values FMmax and FMmax' may be presumed to be at identical levels, as may the focus metric baseline levels FMbaseline and FMbaseline' (e.g., the graphs 500A and 500B may be presumed to have similar vertical scales), for which the numerator in EQUATION 1 (i.e., MAX-BAS) is identical in each case. In other cases the focus metric maximum values FMmax and FMmax' may be presumed to be at different levels, as may the focus metric baseline levels FMbaseline and FMbaseline' (e.g., the graphs 500A and 500B may be presumed to have different vertical scales), for which the numerator in EQUATION 1 (i.e., MAX-BAS) may be different in each case.

The maximum Z-height (e.g., FMmax or FMmax') corresponding to the peak of the focus curve, which corresponds to the best focus position along the Z axis, is the Z-height for the region of interest used to determine the focus curve. In one embodiment, the Z-height corresponding to the peak of the focus curve may be found by fitting a curve to the focus curve data and estimating the location peak of the fitted curve. Exemplary techniques for the determination and analysis of image stacks and focus curves are taught in U.S. Pat. No. 6,542,180, which is commonly assigned and hereby incorporated herein by reference in its entirety.

More generally, the Z-height quality metric Q may be defined as a metric based on a relationship (e.g., a ratio or quotient) between a representative peak height indicated by a focus peak determining data set and a representative noise level or "noise height" indicated by the focus peak determining data set. In one embodiment, such a metric may be defined as the ratio of the maximum value of the focus peak determining data set (or a curve fit to the focus peak determining data set) minus a baseline value of the focus peak determining data set (or a curve fit to the focus peak determining data set) divided by an estimated noise value of the focus peak determining data set. In certain implementations, the baseline of the focus peak determining data set may be estimated as its median value, wherein most of the values in that set may be near the baseline and only a relatively small number of values may occur in the region of the focus peak. Such a focus peak determining data set may correspond to an image stack comprising a relatively large number of images (e.g., 100 images) spread over a fairly large Z-height range about the best focus position, for example. In certain implementations, the estimated noise value may be determined as the median absolute difference from the median of the focus peak determining data set.

For an image stack comprising a relatively large number of images spread over a fairly large Z-height range about the best focus position, large values of Q based on EQUATION 1 reliably indicate a strong focus peak in comparison to the noise level of the underlying data, which produces a relatively reliable Z-height estimate. Based on this disclosure, one of ordinary skill in the art may determine acceptable alternative ways of estimating a Z-height quality metric to be associated with an estimated Z-height determined based on a focus peak determining data set. For example, the standard deviation of the data set may be used as a measure of the noise in the focus metric signal (used in the denominator of EQUATION 1), although that measure may be less desirable in certain implementations in that it incorporates both the focus peak and the noise into a single value. Another measure of the noise may be determined by smoothing the focus metric signal (e.g., using a moving average), and then computing the deviation of the raw focus metric signals from the smoothed signal. In this way, the smoothed signal can be used as an approximation to the signal without noise, and then the noise can be estimated. However, in certain implementations this method may be relatively dependent on the technique that is chosen for smoothing the signal.

Substitutes may be determined for other parts of EQUATION 1, as well. For example, the maximum value of the focus peak determining data set may be replaced with an average of the highest few values in some embodiments. Similarly, the baseline value of the focus peak determining data set may be replaced with an average of the lowest several values in some embodiments. In other embodiments, the difference between the maximum and baseline values (used in the numerator of EQUATION 1) may be estimated based on a fit curve (e.g., a Gaussian curve) rather than based on the raw data of the focus peak determining data set. Other variations may be determined by one of ordinary skill in the art, based on the general principles disclosed herein.

In one embodiment, a Z-height quality metric Q may be utilized for the determination as to which data should be used for the surface reconstruction. In other words, when multiple image stacks are captured at varying light settings for producing a 3D reconstruction of a surface, for a given pixel (i.e., a given surface location in the x-y plane), a sharpness curve may be selected according to the one that has the highest Z-height quality metric among the multiple image stacks. In addition, the Z-height quality metric may also be utilized to reject certain surface points where the focus-based 3D reconstruction from all of the image stacks is still unreliable due to various reasons (e.g., lack of texture, insufficient lighting, oversaturation, surface out of focusing range, etc.).

In other words, in certain embodiments it may be deemed preferable to leave holes in the final reconstructed surface, rather than risking an incorrect or inaccurate reconstruction at those locations.

In various video tools disclosed herein, all the image stacks (e.g., at all lighting levels) are of the same region of interest. Since higher brightness will in general provide increased contrast provided that significant saturation does not occur and no change in lighting angle occurs, brightness may be used as a surrogate for the Z-height quality metric in some embodiments. However, such implementations may not be as robust as using a true subregion Z-height quality metric, in that unpredictable and undesirable effects associated with defocusing a subregion may be recognized and overcome by using a true Z-height quality metric as disclosed herein, whereas such unpredictable and undesirable defocus effects may not be detected and overcome by a simpler subregion brightness analysis.

Figure 6:
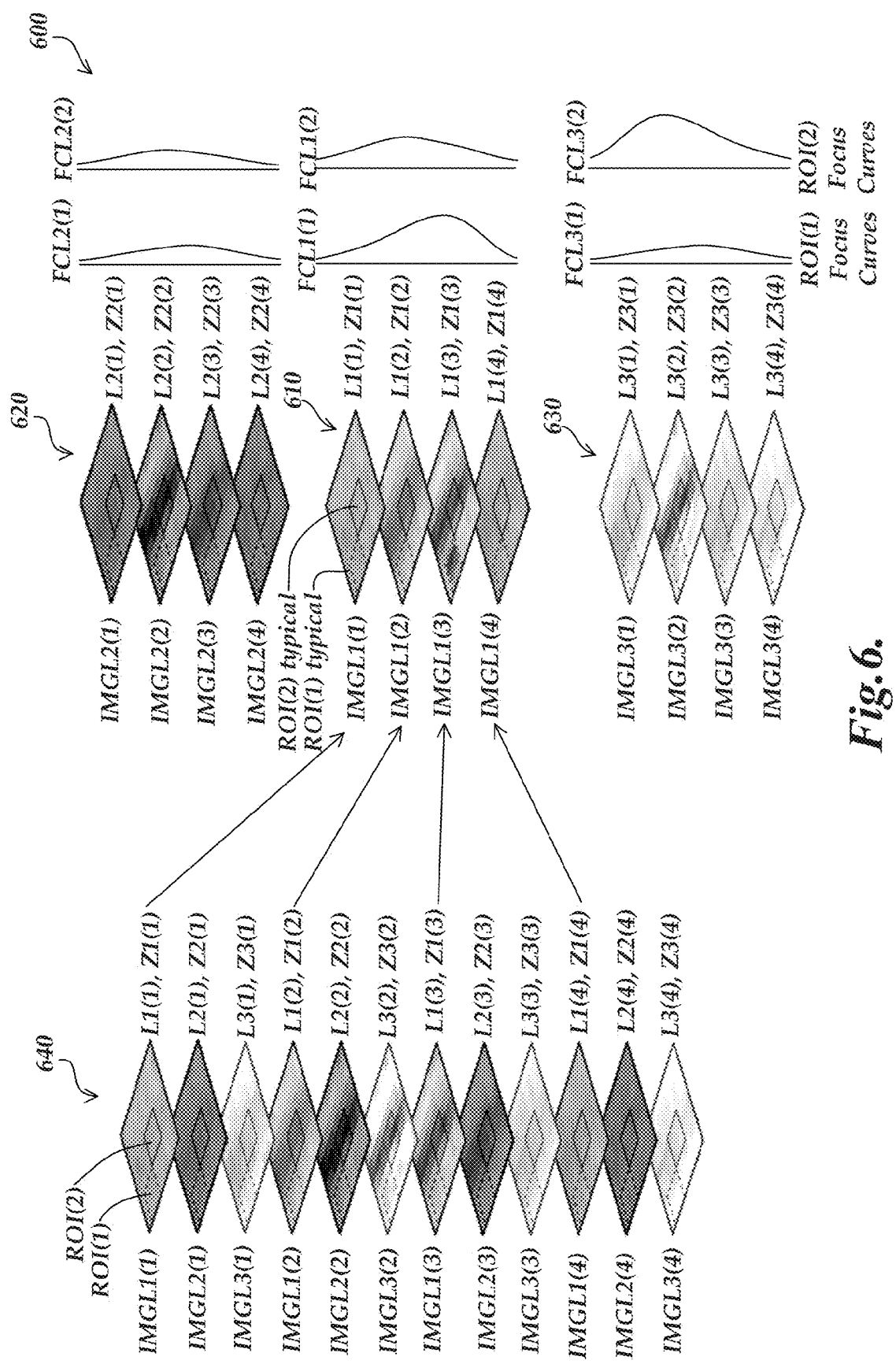
FIG. 6 is a diagram of a series of schematically represented variable focus image stacks taken with varying light settings.

FIG. 6 is a diagram 600 of a series of schematically represented variable focus image stacks 610, 620 and 630. As is known in the art, in order to form each of the image stacks 610, 620 and 630, a camera may move through a range of Z-height positions along a z-axis (the focusing axis) and capture an image at each position. For each captured image, a focus metric may be calculated based on a region or subregion of interest ROI(k) (e.g., a set of pixels) in the image and related to the corresponding Z-height position of the camera along the Z axis at the time that the image was captured. This results in focus curve data (e.g., such as that illustrated in FIGS. 5A and 5B). In one embodiment, the focus metric values may involve a calculation of the contrast or sharpness of the region of interest in the image. In various embodiments, the focus values or curves may be normalized. Various focus metric calculation techniques are described in detail in the incorporated references, and various suitable focus metric functions will also be known to one of ordinary skill in the art.

As shown in FIG. 6, the first image stack 610 (e.g., taken at a mid-range light level) is illustrated as having four images IMG-L1(1) to IMG-L1(4). It will be appreciated that in an actual embodiment, a greater number of images may be included in a given image stack (e.g., 100 images). Each of the images IMG-L1(1) to IMG-L1(4) may be referenced to the given light setting and a respective Z-height. For example, the image IMG-L1(1) may be referenced to the light setting L1(1) and a Z-height Z1(1), while the image IMG-L1(2) may be referenced to the light setting L1(2) and a Z-height Z1(2), while the image IMG-L1(3) may be referenced to the light setting L1(3) and the Z-height Z1(3), and the image IMG-L1(4) may be referenced to the light setting L1(4) and the Z-height Z1(4).

Similarly, the second image stack 620, which is taken at a lower lighting setting (e.g., where very few pixels are oversaturated) is illustrated as including four images IMG-L2(1) to IMG-L2(4). Each of these images may also be referenced to a given light setting and respective Z-height, such as image IMG-L2(1) being referenced to the light setting L2(1) and the Z-height Z2(1), with the remaining images IMG-L2(2) to IMG-L2(4) being similarly referenced according to their given light setting and respective Z-height. Similarly, the third image stack 630 which is taken at a higher light setting (e.g., with very few dark pixels), is illustrated as including four images IMG-L3(1) to IMG-L3(4). Each of these images may also be referenced to a given light setting and respective Z-height, such as image IMG-L3(1) being referenced to the light setting L3(1) and the Z-height Z3(1), with each of the remaining images IMG-L3(2) to IMG-L3(4) being referenced according to their given light setting and respective Z-height. With reference to FIGS. 4A, 4B and 4C above, in one example embodiment, for a pixel in the area 414B, the image 400B may represent a best focused image from the image stack 610 (e.g., image IMG-L1(3)). Similarly, for a pixel from the area 412A, the image 400A may represent a best focused image from the image stack 620 (e.g., the image IMG-L2(2)), while for a pixel from the area 410C, the image 400C may represent a best focused image from the image stack 630 (e.g., the image IMG-L3(2)).

As also shown in FIG. 6, an image stack 640 may be formed to include all of the images that were included in the image stacks 610, 620 and 630. In one embodiment, the Z-heights of the images taken in the stacks 610, 620 and 630 are interspersed (e.g., the first image taken in each stack is done at a different Z-height as opposed to them all being taken at the same Z-height), such that when the stacks are interleaved as illustrated in the image stack 640, all of the images are at different heights. In another embodiment, the images and each of their respective stacks may be taken at approximately the same Z-heights (e.g., the first image in each of the image stacks 610, 620 and 630 is taken at approximately the same Z-height). In one alternative embodiment, rather than the image stacks 610, 620 and 630 being taken individually, the image stack 640 may be acquired as a continuous process, wherein the light settings are adjusted before each image is taken. However, in certain implementations the changing of the light setting before each image is taken is not practical due to the slow response times that may exist in certain existing equipment for changing the lighting settings. In other words, if the equipment that is being used requires too much time to adjust the light settings, it may in certain instances be considered less practical to take the entire image stack 640 as a continuous process.

The first image IMG-L1(1) of image stack 610 is illustrated as including two regions of interest ROI(1) and ROI(2). With regard to the term "region of interest," it will be appreciated that different types of tools (e.g., Z-height tools 143ga) may define and operate with respect to the regions of interest differently. For example, known "multi-point" type autofocus tools (e.g., tools 143gab of FIG. 2) may return multiple Z-heights corresponding to individual "subregions of interest" (e.g., a grid of subregions of interest) within a global region of interest defined by the multi-point type Z-height tool. For example, such subregions of interest may be manually and/or automatically defined as centered on each (or most) pixels within the global region of interest. Thus, in some cases, the regions of interests (e.g., ROI(1) and ROI(2)) may be regarded as representative subregions of interest within a global region of interest. However, the essential point is that a Z-height may be established for any defined region of interest.

Thus, it will be understood that when the term region of interest is used in relation to establishing a Z-height, that subregions of interest (e.g., within a global region of interest defined by a multi-point autofocus tool) may be encompassed within the meaning of that term. To illustrate this point, the regions of interest ROI(1) and ROI(2) are shown to be relatively small (e.g., 3×3 pixels), as would be typical of some subregions of interest of a multi-point autofocus tool. For example, such a region size may be utilized for determining a focus peak for a single central pixel in each region (or subregion) of interest.

Shown at the right hand side of FIG. 6 are qualitatively represented focus curves for the subregions ROI(1) and ROI (2). For example, the focus curve FCL2(1) qualitatively represents the focus curve results for subregions ROI(1) in the qualitatively illustrated image stack IMGL2 located to its immediate left, and so on for the other focus curves. It will be appreciated based on previous description and teachings that a higher focus curve peak may correspond to better image contrast and/or a better Z-height quality metric for the underlying images. Thus, FIG. 6 shows an example where the subregion ROI(1) has the most appropriate lighting level in the image stack IMGL1, leading it to exhibit the highest focus curve peak in that image stack. At the same time, the subregion ROI(2) has the most appropriate lighting level in the image stack IMGL3, leading it to exhibit the highest focus curve peak in that image stack. It will be appreciated based on previous description and teachings that a higher focus curve peak may often correspond to better image contrast and/or a better Z-height quality metric for the underlying images. Thus, in this case, the Z-height for the subregion ROI(1) may be best determined based on the focus curve of the image stack IMGL1, and the Z-height for the subregion ROI(2) may be best determined based on the focus curve of the image stack IMGL3.

Figure 7B:
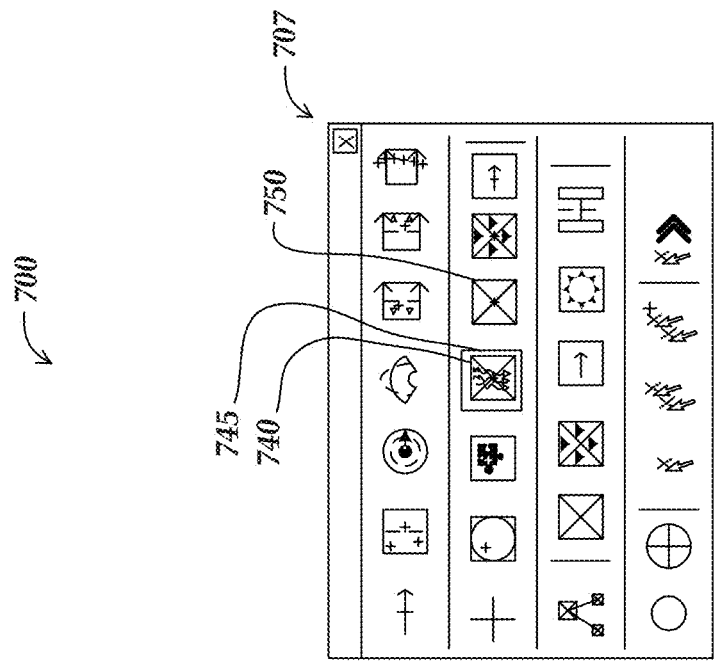
FIGS. 7A and 7B are diagrams illustrating various features of one embodiment of a Z-height measurement tool user interface.
Figure 7A:
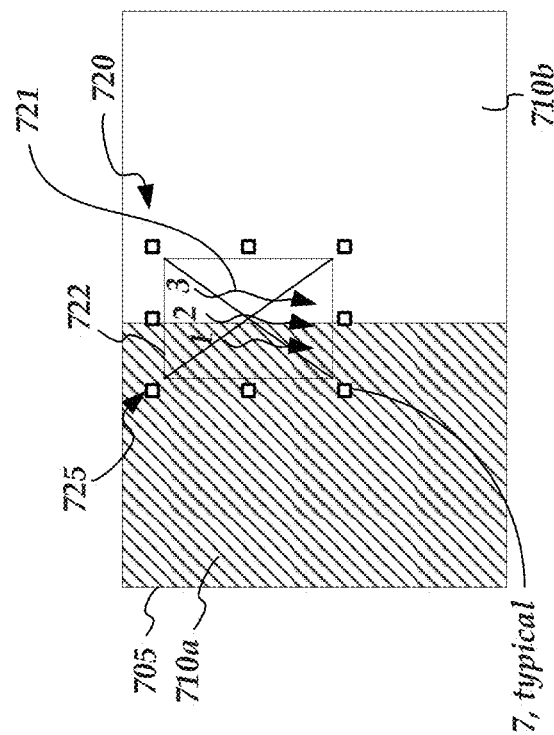

FIGS. 7A and 7B are diagrams illustrating various features of one embodiment of a user interface 700 that includes a Z-height tool user interface 720 (the appearance of which may also be referred to as the Z-height tool user interface widget 720). FIG. 7A shows a field of view 705 including two workpiece surfaces 710a and 710b, and the Z-height tool user interface 720, including a lighting symbol mode indicator 721 that indicates the Z-height tool user interface 720 operates in a multiple image stack and multiple lighting vector Z-height tool mode, and a region of interest or region of interest indicator 722 that is defined while the Z-height tool mode is active. The lighting symbol mode indicator 721 is illustrated as including three curved arrows, which are representative of the multiple image stack and multiple lighting vector operation. It will be appreciated that in some vision systems, a Z-height tool, mode, or method disclosed herein may be provided along with known or conventional Z-height tools, modes or methods. Thus, the lighting symbol mode indicator 721 distinguishes the multiple image stack and multiple lighting vector Z-height tool mode of operation from other modes of Z-height operation. Various aspects of the operation of the Z-height tool and its user interface 720 that are not described in detail below may operate according to known methods in commercial systems, and/or otherwise as described herein.

In the view shown in FIG. 7A, the user interface region of interest 722 has been selected for editing. When the region of interest 722 is selected for editing, a set of size/location editing handles 725 (including individual handles such as handle 727 which may be controlled by dragging) may be displayed along the corners and sides, as shown. The Z-height tool or mode (e.g., as implemented by the user interface 720) enforces certain combinations of operations according to principles outlined above.

FIG. 7B illustrates one embodiment of a tool selection bar 707, including a multiple image stack and multiple lighting vector Z-height tool-type activation button 740. FIG. 7B shows a user interface configuration wherein the tool selection bar 707 indicates that the multiple image stack and multiple lighting vector Z-height tool or mode is active via an "active" box 745 around the multiple image stack and multiple lighting vector Z-height tool or mode button 740, and the other autofocus tool/mode buttons are set to inactive (there is no "active" box around the other tool/mode buttons). This indicates that the current Z-height tool mode is the multiple image stack and multiple lighting vector Z-height tool mode.

In various embodiments, if the user were to "press" one of the other tool/mode buttons (e.g., the conventional Z-height tool or mode button 750), the pressed tool and/or mode would become active and the operations and display elements associated with editing the individual region of interest (indicator) 722 (shown in FIG. 7A), and the operations of the multiple image stack and multiple lighting vector Z-height tool or mode would then be completed and/or disabled. In some embodiments, the state of the tool selection bar 707 in FIG. 7B may correspond to the state of the user interface displayed in FIG. 7A, in that if the region of interest (indicator) 722 is selected or active, the multiple image stack and multiple lighting vector Z-height tool or mode may be made active in association with the tool 720 and other tool/mode buttons may become inactive, regardless of their previous state. This may also be the behavior associated with any other tool when its region of interest (indicator) is selected in the field of view 705.

In one embodiment, a tool mode determining operation may be provided that determines whether one or more instances of the Z-height tool 720 is configured to operate according to a particular implementation, such as a learn-mode governed implementation, or a run-mode originated implementation, etc. In one embodiment, the particular implementation of the Z-height tool 720 may be set by a user using a user interface features such as a configuration menu window or the like that sets operating parameters for the Z-height tools or modes in general, and/or for the multiple image stack and multiple lighting vector Z-height tool or mode in particular.

FIGS. 8A-8D are diagrams illustrating various settings related to one embodiment of a Z-height tool user interface including parameters related to utilizing multiple image stacks and multiple lighting vectors.

In particular, FIGS. 8A-8D are diagrams illustrating various features of one embodiment of an Z-Height Tool parameter dialog box, the tabbed Z-Height Tool parameter dialog box 800, which includes user-selectable tabbed portions 810a, 810b, 810c, and 810d. For all the tabbed portions 810a-810d, the Defaults button at the bottom restores the entries on the tabbed portions 810b, 810c and 810d to their default values, the OK button accepts the current parameters and closes the Z-Height Tool parameter dialog box 800, and the Cancel button returns all parameters to their state before the current editing sequence began and closes the dialog box 800.

Figure 8A:
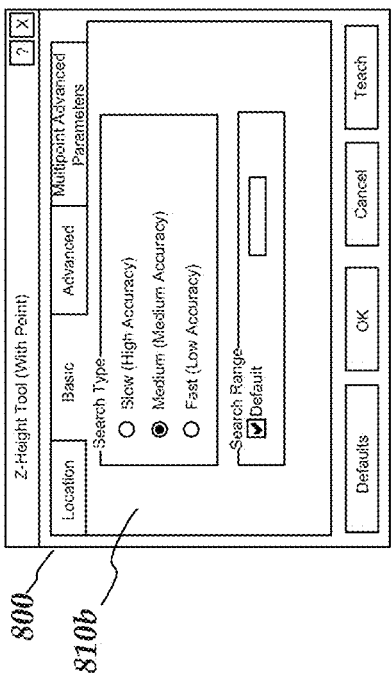
FIGS. 8A-8D are diagrams illustrating various settings related to one embodiment of a Z-height measurement tool user interface including parameters related to utilizing multiple image stacks and multiple lighting vectors.

FIG. 8A illustrates the tabbed portion 810a, which may reflect the X and Y center coordinates, as well as the width (W), height (H), and angular orientation (not shown) of a selected Z-Height tool global region of interest. These values may be determined by graphical definition of the region of interest (e.g., as shown in FIG. 7A), and/or they may be entered directly in the dialog box.

Figure 8B:
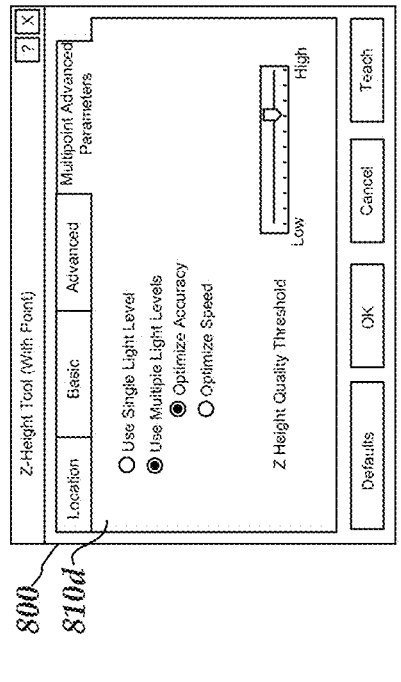

FIG. 8B illustrates tabbed portion 810b, which reflects the Z-Height Tool search type to be employed for the selected region of interest. The search type allows the user to select a desired tradeoff between the speed and accuracy of Z-Height Tool operations in relation to focus curve data and analysis, which may influence the Z spacing between images (that is, the images in an image stack), and the like. One of the search types may be used as a default search type, unless the user enters a different selection. The tabbed portion 810b may also allow the user to influence the determination of the Z-height search range that is used for Z-Height Tool operations (e.g., for the Z range of the images included in an image stack).

In various embodiments, the user may accept and/or select that a default search range be determined and used, or that the search range be based on a nominal (or range midpoint) value entered by the user, or that the search range be based on maximum and minimum values entered by the user. In various embodiments, the Z-Height tool may determine a default search range based on operations during manual mode and/or learn mode set-up of the tool. In any case where the search range is not completely defined by user input, Z-Height tool operations may determine the Z-height search range based on the current machine optical configuration (e.g., the current depth of field or magnification), and/or workpiece information (e.g., expected surface height variations due to fixturing or fabrication variations, or the like) in order to provide an efficient search range that also includes enough range to allow for robust operation with reasonable variations in the region of interest Z-heights during measurement and/or part program execution.

Figure 8C:
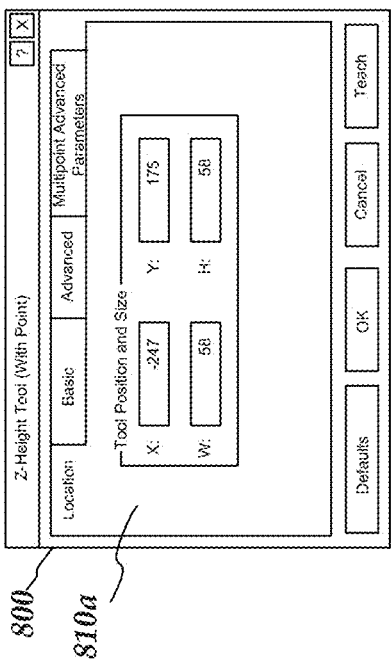

In the embodiment shown in FIGS. 8A-8D, the Z-height tool is a general purpose tool which may be configured to operate either as a single point or a multi-point Z-height tool. FIG. 8C illustrates tabbed portion 810c, which reflects the type of measurement data the Z-Height tool provides for the defined global region of interest. The embodiment shown in FIG. 8C, allows the user to select one of four measurement data types. The "Standard" selection may return a single Z-height for the region of interest. The "Multi-point" selection may automatically provide a Z-height value for a number of subregions (e.g., ROI(k) which have representative x-y coordinate locations) within the global region of interest indicated in the tabbed portion 810a. The "Multi-point Max" and "Multi-point Min" selections may automatically provide the maximum and/or minimum Z-height values within the subregions. When a "Multi-point" selection is entered, the number of subregions, and their representative x-y coordinate locations may be determined (relative to the global region of interest location and extents) based on the number of subregion rows and columns indicated in the "Tool Subregions" parameter boxes.

Figure 8D:
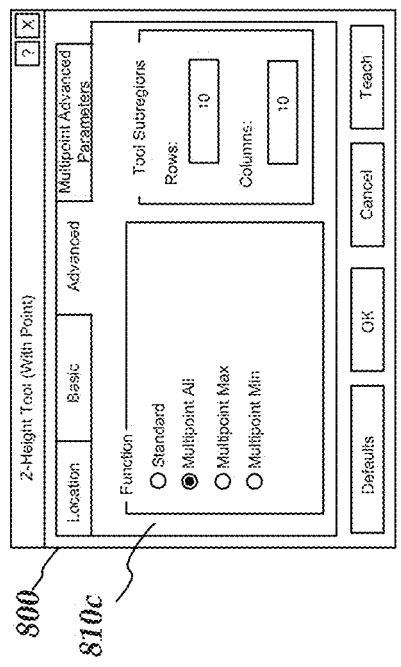

In the embodiment shown in FIGS. 8A-8D, the Z-height tool is a general purpose tool which may be configured to operate a multi-point Z-height tool according to desired tradeoffs between the speed and accuracy of the multi-point Z-Height Tool operations. FIG. 8D illustrates tabbed portion 810d, which reflects parameters that may be used in configuring user preferences for the tool operations. In some embodiments, the elements of tabbed portion 810d may be "greyed out" and/or inactive, except when a multi-point radio button is selected in the tabbed portion 810c. The embodiment shown in FIG. 8D includes a "Use Single Light Level" radio button, which a user may select to force the multi-point Z-height tool operations to use a single light level and a single image stack. Such a mode selection may be appropriate for inspecting workpieces that can be well exposed throughout a region of interest in a single image. Some embodiments of such a mode are currently available in commercially available machine vision inspection systems, and/or may be understood based on this disclosure, and will not be described in greater detail with regard to the "Single Light Level" radio button. The tabbed portion 810d may also include a "Use Multiple Light Levels" radio button, which a user may select to force the multi-point Z-height tool operations to use a mode comprising operations wherein a plurality of light levels are used to acquire a corresponding plurality of image stacks, and multi-point Z-height measurements are based on an analysis of the plurality of image stacks, all using an embodiment disclosed herein. Such a mode selection is appropriate for inspecting workpieces that cannot be well exposed throughout a region of interest in a single image (e.g., a workpiece such as that shown in FIGS. 3 and 4).

The embodiment shown in FIG. 8D includes an "Optimize Accuracy" radio button and an "Optimize Speed" radio button which a user may select when the "Use Multiple Light Levels" radio button is selected. In some embodiments, these elements may be "greyed out" and/or inactive, except when the "Use Multiple Light Levels" radio button is selected. The "Optimize Accuracy" radio button may force the "Use Multiple Light Levels" mode to use two or three light levels and corresponding image stacks for determining the multi-point Z-height measurements.

Figure 12:
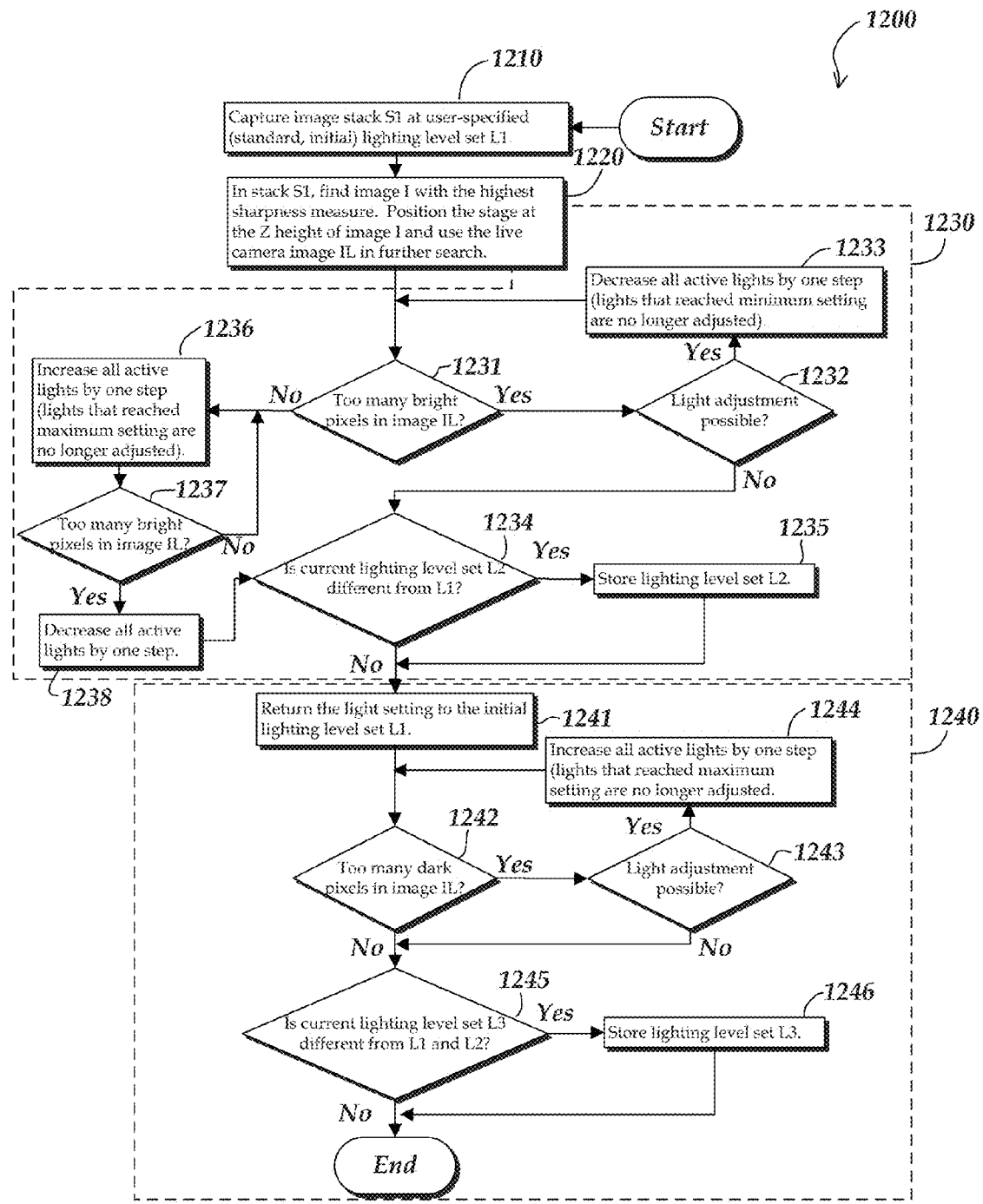
FIG. 12 is a flow diagram illustrative of an exemplary routine which shows one embodiment of operations for determining lighting parameters within the routines of FIG. 9, 10 or 11.
Figure 13:
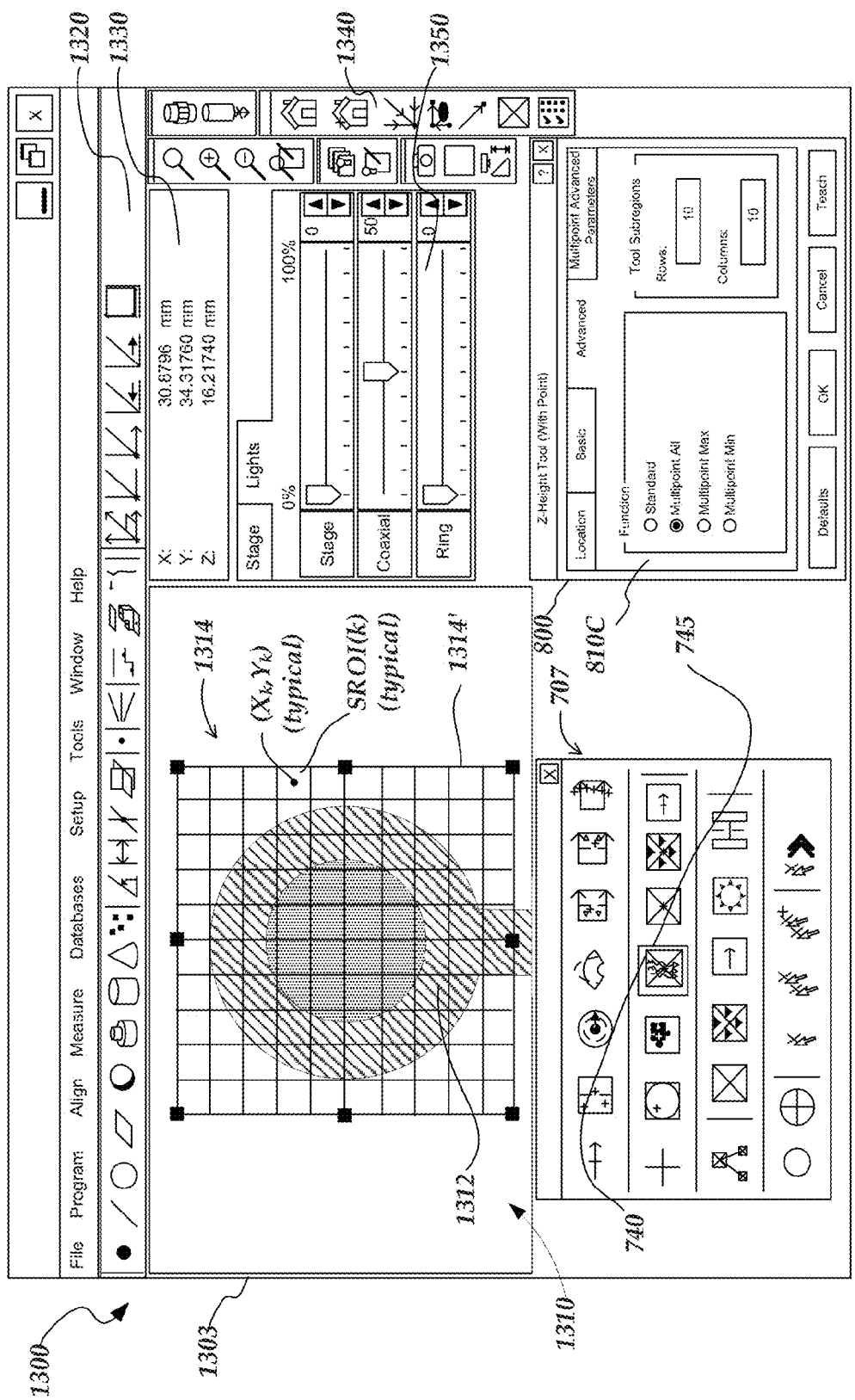
FIG. 13 is a diagram illustrating one embodiment of a machine vision inspection system user interface display including various features associated with a Z-height measurement tool that utilizes multiple image stacks and light settings.

For example, in one embodiment, only two light levels may be determined as outlined and described in relation to lighting level L2 and L3 of FIG. 13, wherein the brightness limiting light level is determined in a way that may optimize brightness and contrast for as many subregions as possible. In another embodiment, two light levels may be determined as outlined and described in relation to lighting level L2 and L3 of FIG. 12 or FIG. 13, and a third light level may be that is a nominal light level between L1 and L3 (e.g., the light level L1, or an automatically determined average light level between L2 and L3, or the like). Such an embodiment, may provide an image stack wherein some of the subregions have a better Z-height quality metric in a third image stack at an intermediate light level, resulting in more accurate Z-height measurements for those subregions.

The "Optimize Speed" radio button allows the "Use Multiple Light Levels" mode to use two or even one light level if such light levels are sufficient to satisfy both brightness limiting criterion for pixels in the region of interest and darkness limiting criterion for pixels in the region of interest as disclosed for various embodiments herein. For example, in some particular regions of interest the lighting level L1 of FIG. 12, may satisfy both criteria, and a single image stack using that light level may be used to determine the Z-height measurements for all subregions. It will be appreciated that this is substantially equivalent to using the "Use single light level" mode, except that the determination to use this mode is based on automatic analysis performed by the video tool operations. In another example, in some particular regions of interest the lighting levels L2 and L3 of FIG. 12 may not be as optimal as those that would be determined by the method of FIG. 13, but may nevertheless satisfy both criteria, and a two image stacks using those two light levels may be used to determine the Z-height measurements for all subregions.

The Z-Height Quality Threshold slider shown in the tabbed portion 810$d$ may be used to adjust a rejection threshold for Z-height measurements. That is, as disclosed for various embodiments herein, each subregion Z-height measurement is selected to be from an image stack where that subregion is determined to have the best Z-height quality metric. In some applications, it may be important that each Z-height measurement be suppressed or marked with a caution or error indicator if it has a Z-height quality metric that indicates that it may be an unreliable measurement based on unreliable or noisy focus curve data (e.g., a low Z-height quality metric value). The Z-Height Quality Threshold slider may be adjusted by a user to alter the Z-height quality metric rejection threshold suppressing or marking a Z-height measurement in this manner. However, it will be appreciated that the tabbed portions 810$c$ and 810$d$ are exemplary only, and not limiting. More generally, they may be adapted as needed to support any desired implementation that falls within the scope of the embodiments disclosed herein.

Figure 9A:
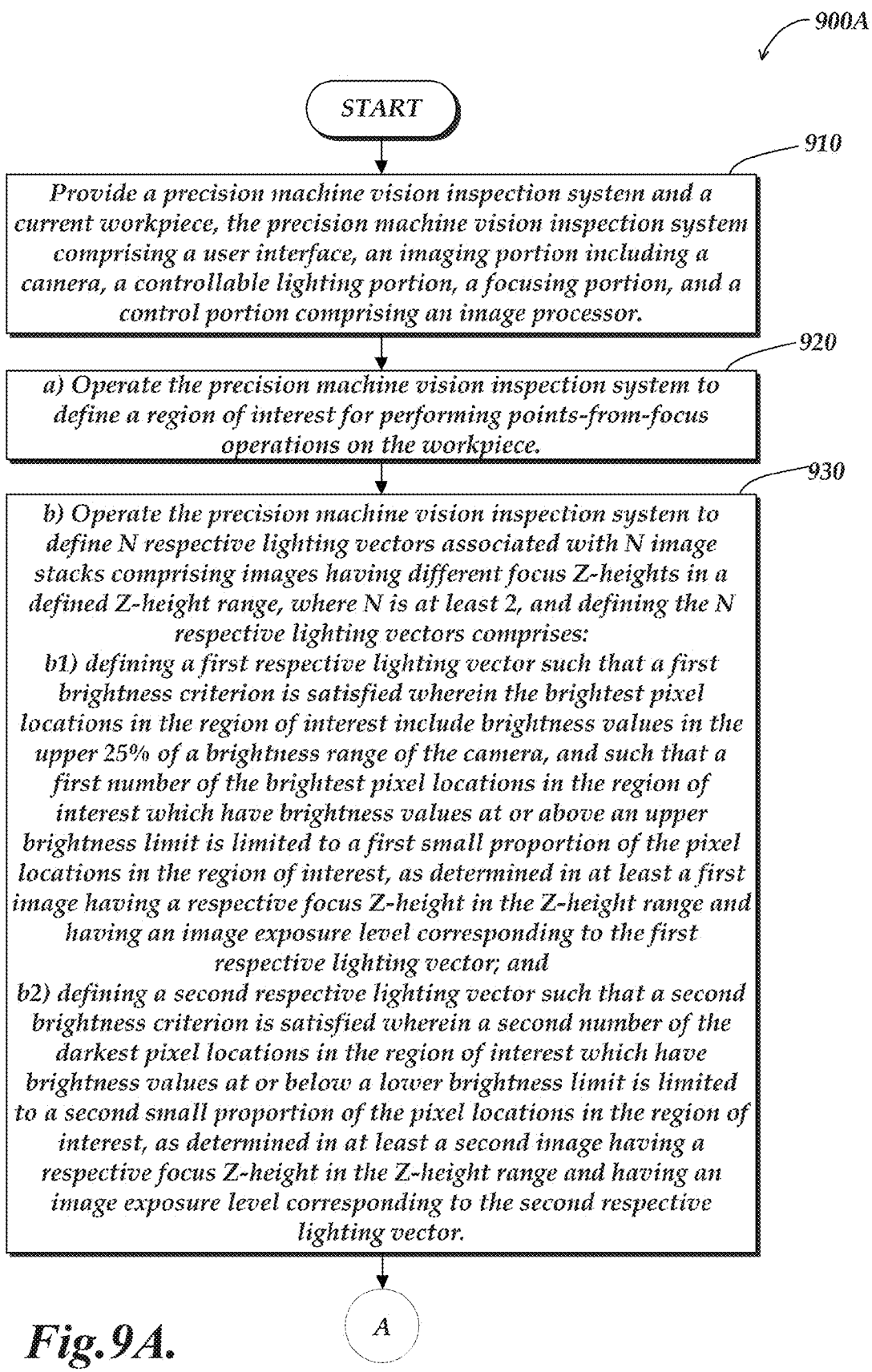
FIGS. 9A and 9B are flow diagrams illustrative of an exemplary routine showing one embodiment for performing Z-height measurements utilizing multiple image stacks and multiple lighting vectors.
Figure 9B:
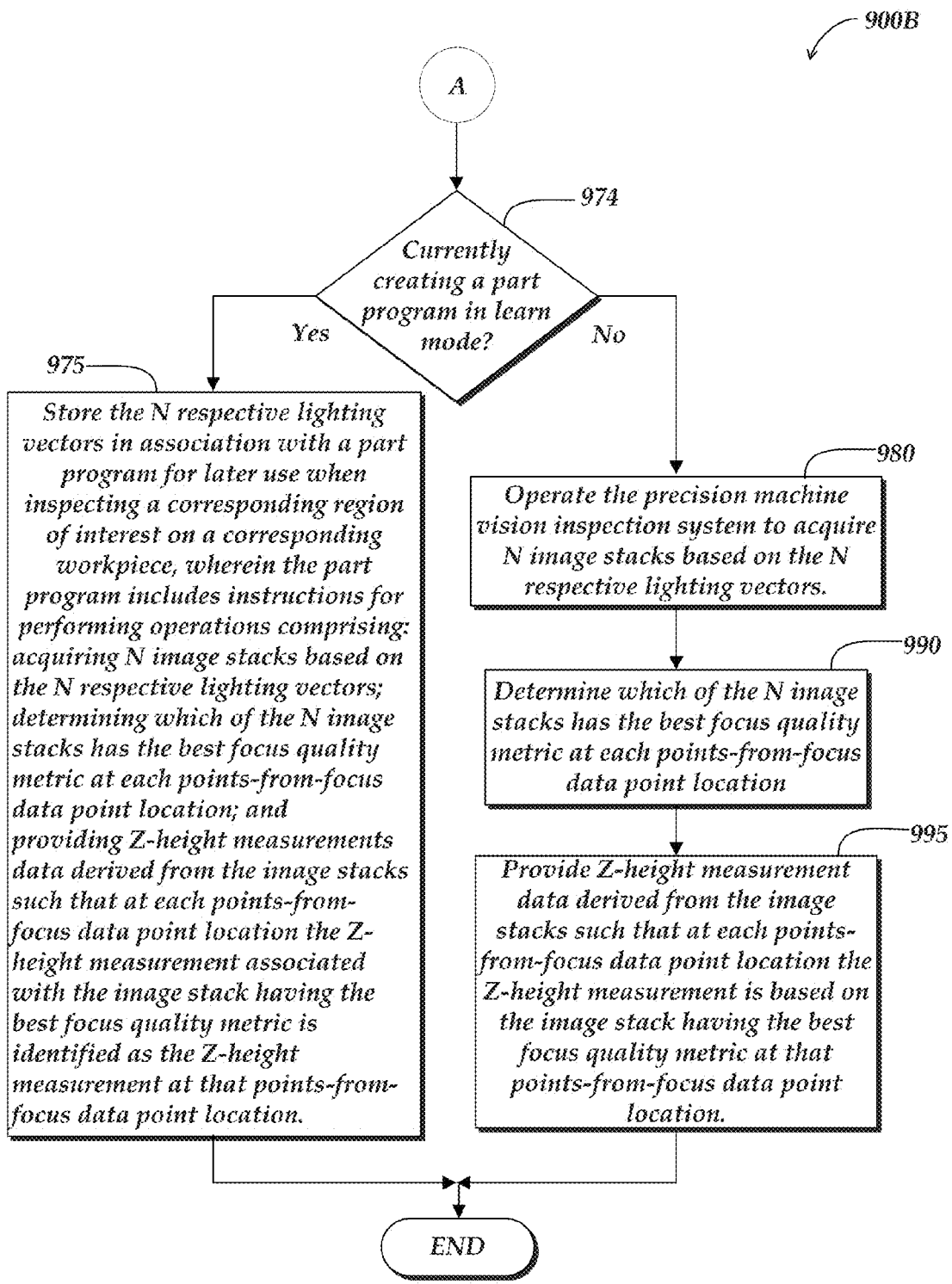

FIGS. 9A and 9B are flow diagrams illustrative of an exemplary routine 900 for performing Z-height measurements utilizing multiple image stacks and multiple lighting vectors. As shown in FIG. 9A, at a block 910, a precision machine vision inspection system and a current workpiece are provided. The precision machine vision inspection system may comprise a user interface, an imaging portion including a camera, a controllable lighting portion, a focusing portion, and a control portion comprising an image processor. At a block 920, the precision machine vision inspection system is operated to define a region of interest for performing points-from-focus operations on the workpiece.

At a block 930, the precision machine vision inspection system is operated to define N respective lighting vectors associated with N image stacks comprising images having different focus Z-heights in a defined Z-height range, where N is at least 2, and wherein defining the N respective lighting vectors comprises at least two steps. The first step for defining the N respective lighting vectors includes defining a first respective lighting vector such that a first brightness criterion is satisfied wherein the brightest pixel locations in the region of interest include brightness values in the upper 25% of a brightness range of the camera, and such that a first number of the brightest pixel locations in the region of interest which have brightness values at or above an upper brightness limit is limited to a first small proportion of the pixel locations in the region of interest, as determined in at least a first image having a respective focus Z-height in the Z-height range and having an image exposure level corresponding to the first respective lighting vector.

The second step for defining the N respective lighting vectors includes defining a second respective lighting vector such that a second brightness criterion is satisfied wherein a second number of the darkest pixel locations in the region of interest which have brightness values at or below a lower brightness limit is limited to a second small proportion (e.g., 0.1%) of the pixel locations in the region of interest, as determined in at least a second image having a respective focus Z-height in the Z-height range and having an image exposure level corresponding to the second respective lighting vector. The routine 900A then continues to a point A, as continued in FIG. 9B.

As shown in FIG. 9B, from the point A, the routine 900B continues to a decision block 974. At the decision block 974, a determination is made as to whether operations are being performed for currently creating a part program in learn mode. If operations are not being performed for currently creating a part program in learn mode (e.g., if a run mode is currently being executed), then the routine continues to a block 980, as will be described in more detail below. If at decision block 974 it is determined that operations are being performed for currently creating a part program in learn mode, then the routine continues to a block 975.

At the block 975, the N respective lighting vectors are stored in association with a part program for later use when inspecting a corresponding region of interest on a corresponding workpiece, wherein the part program includes instructions for performing at least three operations. The first part program operation comprises acquiring N image stacks based on the N respective lighting vectors. The second part program operation comprises determining which of the N image stacks has the best Z-height quality metric at each points-from-focus data point location. The third part program operation comprises providing Z-height measurements data derived from the image stacks such that at each points-from-focus data point location the Z-height measurement associated with the image stack having the best Z-height quality metric is identified as the Z-height measurement at that points-from-focus data point location.

At the block 980 (e.g., if a run mode is currently being executed), the precision machine vision inspection system is operated to acquire N image stacks based on the N respective lighting vectors. At a block 990, a determination is made as to which of the N image stacks has the best Z-height quality metric at each points-from-focus data point location. At a block 995, Z-height measurement data derived from the image stacks is provided such that at each points-from-focus data point location the Z-height measurement is based on the image stack having the best Z-height quality metric at that points-from-focus data point location.

With regard to FIGS. 9A and 9B, it will be appreciated that in different implementations, the described operations may be performed at different times or in different sequences. For example, the defining of the first and second lighting vectors that is described in FIG. 9A, may require a certain amount of processing time in the search for the desired lighting levels, which as noted above may in certain implementations not be performed during a run mode, so as to increase the speed of the algorithm. This type of run mode may be referenced as a "static" run mode, in which the first and second lighting vectors that are determined and saved during the learn mode are utilized as the first and second lighting vectors during the run mode. However, in an alternative embodiment, a "dynamic" run mode may be utilized, in which first and second lighting vectors are determined during the run mode. Such an implementation may be desired in certain circumstances, such as where higher accuracy is needed, or in accordance with an evaluation of whether the first and second lighting vectors stored during the learn mode produce satisfactory results during the run mode, which if they do not, then the run mode may perform the additional dynamic search to redetermine the first and second lighting vectors.

With regard to the operations of FIG. 9B, the storing of the lighting vectors as part of the learn mode will typically be performed, although in certain implementations, during the learn mode the image stacks may still be acquired so that the user may review the results. In other words, during the learn mode, once the lighting vectors are determined, rather than simply storing the lighting vectors, operations may be performed to acquire the image stacks and determine the resulting Z-height measurements, so that the user may review the results to determine if they are satisfactory. If the user determines the results are satisfactory, then the lighting vectors are stored as part of the part program, whereas if the results are not satisfactory, the lighting vectors may not be stored.

Figure 10:
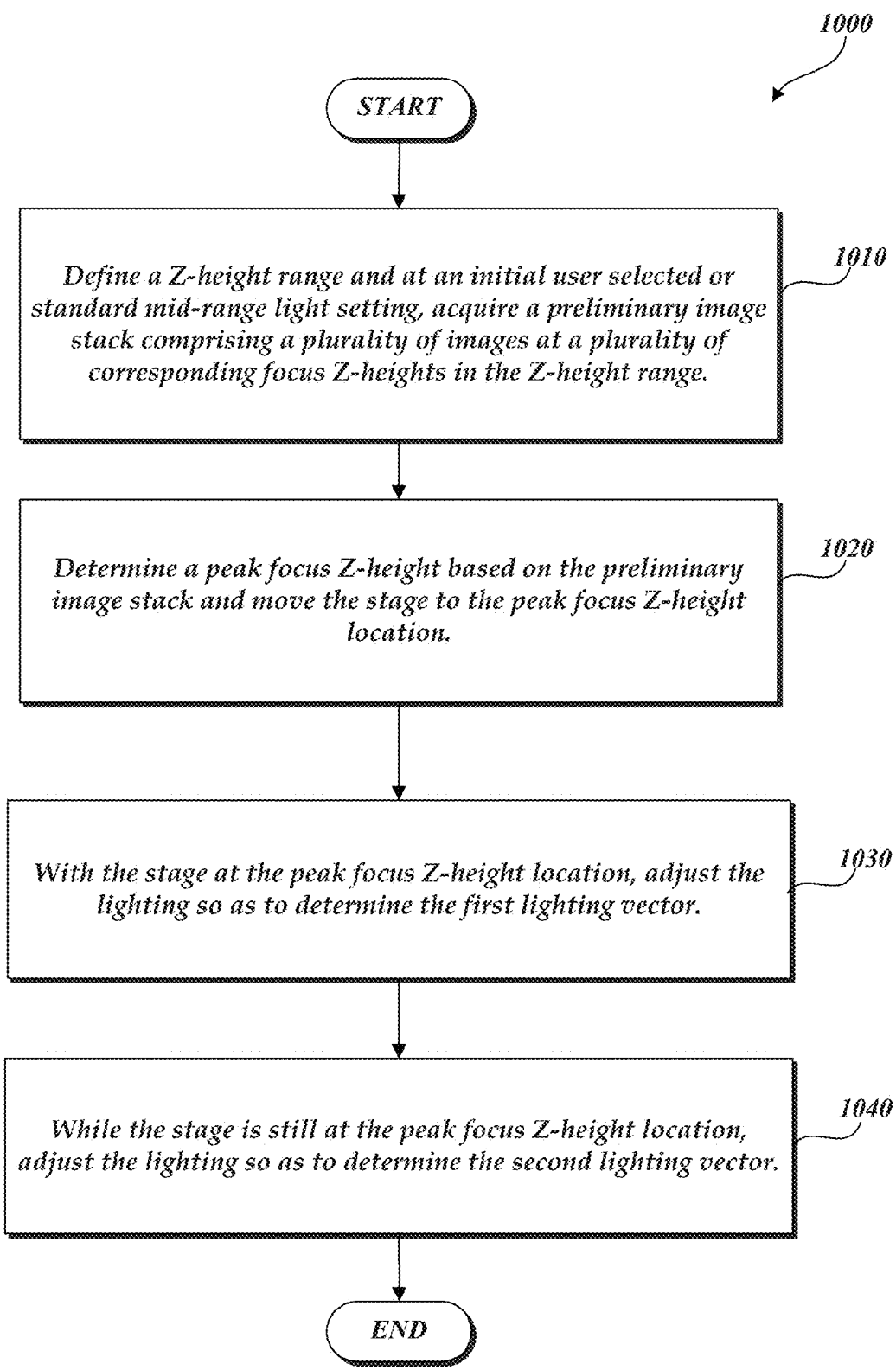
FIG. 10 is a flow diagram illustrating an exemplary routine for searching for multiple lighting vectors while utilizing only a single image and a single Z-height.

FIG. 10 is a flow diagram illustrating an exemplary routine 1000 for searching for multiple lighting vectors while utilizing only a single image and single Z-height. As will be described in more detail below, the utilization of a single representative Z-location for performing the lighting adjustments to determine the desired lighting levels increases the speed of the algorithm. As shown in FIG. 10, at a block 1010, a Z-height range is defined and at an initial user selected or standard mid-range light setting, a preliminary image stack is acquired comprising a plurality of images at a plurality of corresponding focus Z-heights within the Z-height range.

At a block 1020, a peak focus Z-height is determined based on the preliminary image stack, and the stage is moved to the peak focus location. In one embodiment, the determination of the peak focus Z-height is done in accordance with a standard sharpness (e.g., contrast) measure which is applied to find the representative image from the preliminary image stack. In this process, the entire image may be used to compute the measure (as opposed to only a small local region of interest). At a block 1030, with the stage at the peak focus location, the lighting is adjusted so as to determine the first lighting vector. At a block 1040, with the stage still at the peak focus location, the lighting is adjusted so as to determine the second lighting vector.

It will be appreciated that this determination of a single image (i.e., a single Z-location for the stage) to best represent the image stack is done to increase the speed of the algorithm. In other words, in certain implementations the capturing and analyzing of an entire image stack after each lighting adjustment would be relatively slow. Instead, a single image (i.e., a single Z-location that the stage is moved to) may be relied upon to determine how the lighting adjustments change the illumination of the surface. This single "live" camera image at the specified Z-location can then be captured and analyzed repeatedly and rapidly in the adjustment loops of the algorithm. This utilization of a single image is effective in that in certain implementations it has been experimentally determined that images with the higher overall sharpness measures tend to best represent the image stack. This is due to the fact that such images tend to maximize the contrast, resulting in the largest numbers of too dark and/or too bright pixels (if any) that are utilized for the light adjustment routines of various embodiments.

Figure 11A:
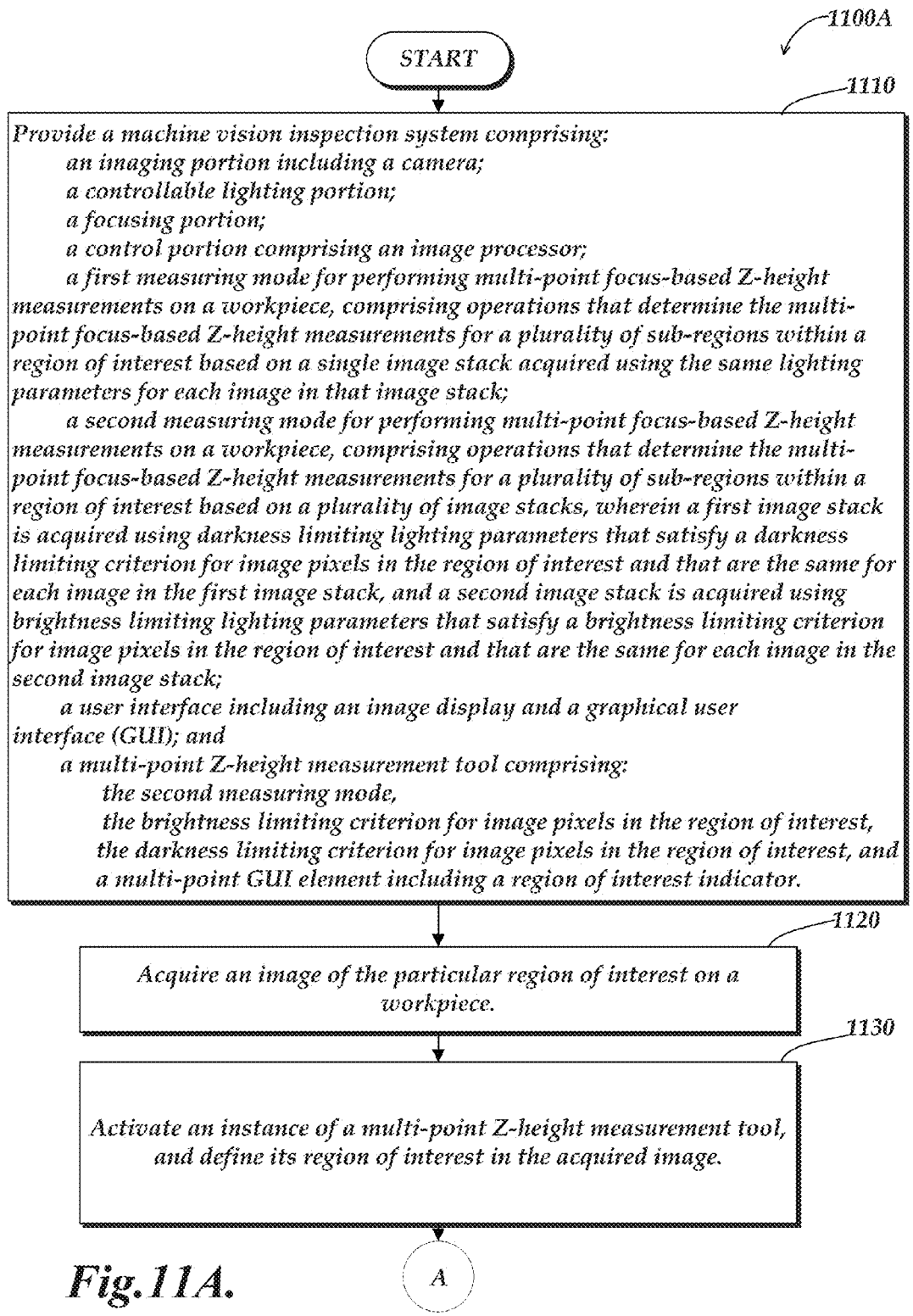
FIGS. 11A and 11B are flow diagrams illustrative of an exemplary routine showing another embodiment for performing Z-height measurements utilizing multiple image stacks and multiple lighting vectors.
Figure 11B:
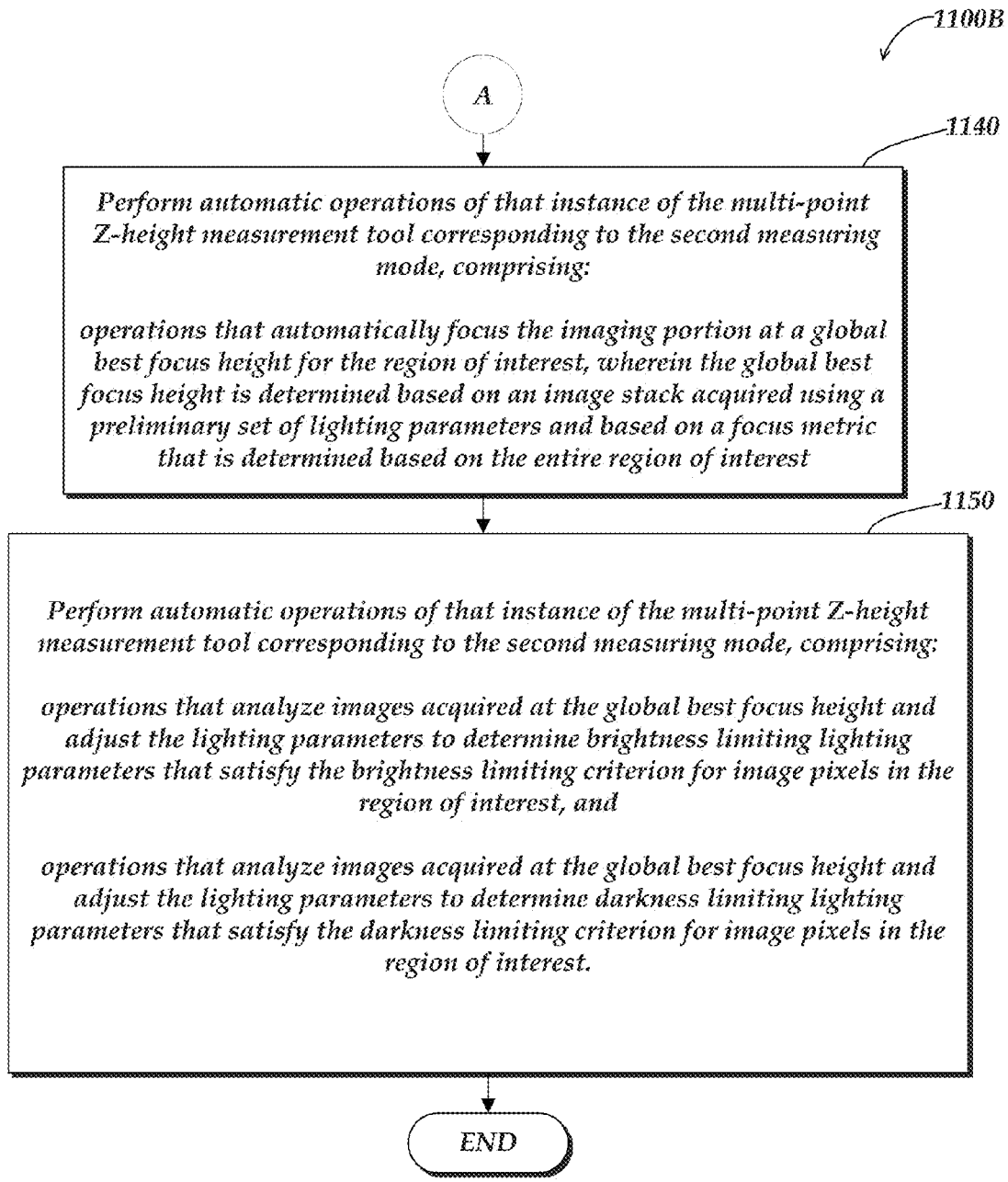

FIGS. 11A and 11B are flow diagrams illustrative of an exemplary routine comprising routine portions 1100A and 1100B for performing Z-height measurements utilizing multiple image stacks and multiple lighting vectors. In various embodiments the operations of the routine 1100 may be performed using various combinations of features and teachings disclosed throughout this application, and/or as disclosed in the incorporated references.

As shown in FIG. 11A, at a block 1110, a machine vision inspection system is provided comprising: an imaging portion including a camera; a controllable lighting portion; a focusing portion; a control portion comprising an image processor; a first measuring mode for performing multi-point focus-based Z-height measurements on a workpiece, comprising operations that determine the multi-point focus-based Z-height measurements for a plurality of subregions within a region of interest based on a single image stack acquired using the same lighting parameters for each image in that image stack; a second measuring mode for performing multi-point focus-based Z-height measurements on a workpiece, comprising operations that determine the multi-point focus-based Z-height measurements for a plurality of subregions within a region of interest based on a plurality of image stacks, wherein a first image stack is acquired using darkness limiting lighting parameters that satisfy a darkness limiting criterion for image pixels in the region of interest and that are the same for each image in the first image stack, and a second image stack is acquired using brightness limiting lighting parameters that satisfy a brightness limiting criterion for image pixels in the region of interest and that are the same for each image in the second image stack; a user interface including an image display and a graphical user interface (GUI); and a multi-point Z-height measurement tool comprising: the second measuring mode, the brightness limiting criterion for image pixels in the region of interest, the darkness limiting criterion for image pixels in the region of interest, and a multi-point GUI element including a region of interest indicator.

At a block 1120, an image of the particular region of interest on a representative workpiece is acquired and the acquired image of the object is displayed on the image display.

At a block 1130, an instance of a multi-point Z-height measurement tool is activated, and its region of interest is defined in the acquired image. The routine 1100A then continues to a point A, as continued in FIG. 11B.

As shown in FIG. 11B, from the point A, the routine 1100B continues to a block 1140. At the block 1140, automatic operations of that instance of the multi-point Z-height measurement tool corresponding to the second measuring mode are performed that automatically focus the imaging portion at a global best focus height for the region of interest, wherein the global best focus height is determined based on an image stack acquired using a preliminary set of lighting parameters and based on a focus metric that is determined based on the entire region of interest.

At a block 1150, automatic operations of that instance of the multi-point Z-height measurement tool corresponding to the second measuring mode are performed, comprising operations that analyze images acquired at the global best focus height and adjust the lighting parameters to determine brightness limiting lighting parameters that satisfy the brightness limiting criterion for image pixels in the region of interest, and operations that analyze images acquired at the global best focus height and adjust the lighting parameters to determine darkness limiting lighting parameters that satisfy the darkness limiting criterion for image pixels in the region of interest.

It will be appreciated that the routine 1100 outlined above is exemplary only, and not limiting. In some embodiments, the routine may further comprise: acquiring a plurality of image stacks including the region of interest, that plurality of image stacks comprising at least a first image stack acquired using the determined darkness limiting lighting parameters and a second image stack acquired using the determined brightness limiting lighting parameters, and determining the multi-point focus-based Z-height measurements for each of a plurality of subregions within the region of interest based on the plurality of image stacks. In some embodiments, the plurality of image stacks may comprise one or more additional image stacks acquired using a set of lighting parameters that provide intermediate levels of illumination in comparison to those used for the first and second image stacks. In some embodiments, the plurality of image stacks comprises the image stack acquired using the preliminary set of lighting parameters.

In some embodiments, the routine may further comprise the operations that determine the multi-point focus-based Z-height measurements for a plurality of subregions within a region of interest based on a plurality of image stacks, and those operations may comprise for each of the plurality of subregions: determining a Z-height quality metric for that subregion for each of the plurality of image stacks; and determining the focus-based Z-height measurement for that subregion based on the one of the plurality of image stacks that provides the best Z-height quality metric.

In some embodiments, the routine may comprise performing at least a portion of the routine under the control of part program instructions during a run mode.

In some embodiments, the routine may comprise performing at least a portion of the routine during a learn mode, and may further comprise recording part program instructions corresponding to a current instance of the multi-point Z-height measurement tool, the part program instructions usable to perform operations comprising: acquiring a plurality of image stacks including the region of interest, that plurality of image stacks comprising at least a first image stack acquired using the determined darkness limiting lighting parameters and a second image stack acquired using the determined brightness limiting lighting parameters; and determining the multi-point focus-based Z-height measurements for each of a plurality of subregions within the region of interest based on the plurality of image stacks, comprising for each subregion: determining a Z-height quality metric for that subregion for each of the plurality of image stacks; and determining the focus-based Z-height measurement for that subregion based on the one of the plurality of image stacks that provides the best Z-height quality metric.

In some embodiments, the method may comprise performing the operations of the machine vision inspection system during a learn mode, wherein: in the step of acquiring an image of the particular region of interest, the workpiece is a representative workpiece and the step comprises displaying the acquired image on the image display; the step of activating an instance of a multi-point Z-height measurement tool comprises displaying its multi-point GUI element in the image display; and the step of defining a region of interest in the acquired image comprises defining a region of interest in the displayed image by positioning the region of interest indicator of the multi-point GUI element to surround the particular region of interest. Other possible additions and variations of the routine will be apparent to one of ordinary skill in the art having the benefit of this disclosure.

FIG. 12 is a flow diagram illustrative of an exemplary routine 1200 for determining an adaptable number of lighting levels (e.g., within the routines of FIG. 9, 10 or 11). As will be described in more detail below, the blocks 1210, 1220, as well as the groups of blocks 1230 and 1240, illustrate certain more detailed functions (e.g., wherein the number of light levels that are saved are adaptable, as compared to the more general operations described above with respect to the blocks 1110-1140 of FIG. 11. As shown in FIG. 12, at a block 1210, an image stack S1 is captured at a user-specified (standard, initial) lighting level set L1. The user-specified (standard, initial) lighting level set L1 is assumed to be a reasonable mid-range average lighting setting that shows the surface well, but may not succeed in removing all of the too dark or too bright areas.

At a block 1220, in the image stack S1, an image I with the highest sharpness measure is determined. The stage is then positioned at the Z-height of the image I and a live camera image IL is utilized for the further search for the additional lighting levels. In one embodiment, when the images in the stack S1 are being evaluated to determine which one will represent the stack, each entire image is used to compute the sharpness measure (as opposed to only a small local region of interest being used to compute the sharpness measure). As described above, this determination of a single image (and the corresponding Z-height location for the stage) that best represents the image stack is beneficial, in that it allows the algorithm to operate at a higher speed. In other words, capturing and analyzing the entire image stack after each light adjustment would be relatively slow. Instead, a single live camera image may be relied upon to determine how the lighting adjustments change the illumination of the surface, wherein such a live camera image can be repeatedly and rapidly captured and analyzed in the adjustment loops of the algorithm.

As will be described in more detail below, the group of blocks 1230 (including blocks 1231-1235), determine a lighting level set L2 (which in one embodiment corresponds to the first lighting vector of block 1130 of FIG. 11), and make a determination as to whether or not the lighting level set L2 will be stored. At decision block 1231, a determination is made as to whether there are currently too many bright pixels in the image IL. In one embodiment, a pixel is defined as being bright if its gray scale is larger than a threshold (e.g., a gray scale of 230). Whether there are too many bright pixels may be determined in accordance with whether the bright pixels comprise more than a threshold fraction of the total number of pixels in the image (e.g., 0.001 of the total number of image pixels).

If at decision block 1231 it is determined that there are not too many bright pixels in the image IL, then the routine continues to a block 1236, as will be described in more detail below. If it is determined that there are too many bright pixels in the image IL, then the routine continues to a decision block 1232, where a determination is made as to whether additional light adjustment is possible. In general, additional light adjustment is considered to still be possible as long as all of the lighting variables have not already been turned all of the way down. If at decision block 1232 it is determined that light adjustment is no longer possible, then the routine continues to decision block 1234, as will be described in more detail below. If it is determined that light adjustment is still possible, then at a block 1233 all of the active lights are decreased by one step. In various alternative embodiments, the decreased amount of the lights may vary or may be different from light to light, as opposed to all being done together. Lights that have already been turned all the way down and have a setting of zero are no longer adjusted. The routine then returns to decision block 1231.

As previously indicated, if at decision block 1231 it is determined that there are not too many bright pixels in the image IL, then the routine continues to a block 1236. At the block 1236, all active lights are increased by one step. Lights that reached their maximum setting are no longer adjusted. Then the routine continues to a decision block 1237 where a determination is made as to whether there are currently too many bright pixels in the image IL. If at decision block 1237 it is determined that there are not too many bright pixels in the image IL, then the routine continues back to block 1236. If at decision block 1237 it is determined that there are too many bright pixels in the image IL, then the routine continues to a block 1238. At the block 1238, all active lights are decreased by one step (to return to a light level where there are not too many bright pixels) and the routine continues to decision block 1234. It will be appreciated that the result of the operations of blocks 1236-1238 is to provide light levels that are as high as possible without producing too many bright pixels, in the case that the initial light level is not at least as bright as the "too many bright pixel criterion" allows, which may be advantageous in some embodiments.

At decision block 1234, a determination is made as to whether the current lighting level set L2 is different from the initial lighting level set L1. If the current lighting level set L2 is not different from the lighting level set L1 then the routine continues to a block 1241, as will be described in more detail below. If the current lighting level set L2 is different from the lighting level set L1, then the routine continues to a block 1235, where the lighting level set L2 is stored as part of the part program, after which the routine continues to block 1241.

As will be described in more detail below, the group of blocks 1240 (including blocks 1241-1246), determine a lighting level set L3 (which in one embodiment corresponds to the second lighting vector of block 1140 of FIG. 11), and make a determination as to whether or not the lighting level set L3 will be stored. At block 1241, as an initial step the light setting is returned to the initial lighting level set L1, in order to begin searching in the opposite direction for a higher lighting level that meets a specified set of criteria. At a decision block 1242, a determination is made as to whether there are too many dark pixels in the image IL. In one embodiment, a pixel is defined as being dark if its gray scale is smaller than a specified threshold (e.g., a gray scale of 50.) In addition, the determination as to whether there are "too many" dark pixels may be made in accordance with whether the number of dark pixels are more than a threshold fraction of the total number of pixels in the image (e.g., 0.001 of the total number of image pixels).

If at decision block 1242 it is determined that there are not too many dark pixels in the image IL, then the routine continues to a decision block 1245, as will be described in more detail below. If it is determined that there are too many dark pixels in the image IL, then the routine continues to a decision block 1243, where a determination is made as to whether further light adjustment is possible. Additional increases in the lighting adjustment are considered to still be possible as long as all of the lighting variables have not already been turned all of the way up.

If at decision block 1243 it is determined that additional light adjustment is not possible (thus indicating that the adjustable lighting settings have already been turned all of the way up), then the routine continues to decision block 1245, as will be described in more detail below. If at decision block 1243 it is determined that light adjustment is still possible, then the routine continues to a block 1244, where the active lights are increased by one step. In various alternative embodiments, the increased amounts of the lights may vary or may be different from light to light, as opposed to all being done together. Individual lights that have already reached a maximum setting are no longer adjusted. The routine then returns to decision block 1242.

At decision block 1245, a determination is made as to whether the current lighting level set L3 is different from the initial lighting level set L1 and L2. If it is determined that the current lighting level set L3 is different from the lighting level set L1 and L2, then the routine proceeds to a bock 1246, where the lighting level set L3 is stored in the part program. If it is determined that the current lighting level set L3 is not different from the lighting level set L1 or L2, then the routine ends without storing the lighting level set L3.

As noted above, depending on the evaluation of the lighting level sets L2 and L3 (i.e., whether they are sufficiently different from the initial lighting set L1 and/or each other) they may or may not be stored. Thus, depending on the lighting conditions, two, one or no additional lighting level sets may be stored and used (the algorithm may not save any additional lighting level sets if the user-specified lighting set L1 provides adequate surface illumination).

FIG. 13 is a diagram illustrating one embodiment of a machine vision inspection system user interface display 1300 including various features associated with a Z-height measurement tool that utilizes multiple light settings and image stacks. In the exemplary state shown in FIG. 13, the user interface display 1300 includes a field of view window 1303 that displays a workpiece image 1310. The user interface 1300 also include various measurement and/or operation selection bars such as the selection bars 1320 and 1340, a real-time X-Y-Z (position) coordinate window 1330, and a light control window 1350.

The field of view window 1303 includes an exemplary multipoint Z-Height tool widget 1314 and a corresponding global region of interest 1314' defined by the outer boundaries of the widget 1314 and superimposed upon a current workpiece feature 1312 to be inspected. As shown in FIG. 13 the global region of interest 1314' is subdivided into 10×10 subregions of interest SROI(k) (e.g., for k=1 to 100). Each subregion SROI(k) may be associated with a representative central location $(X_k, Y_k)$, and may include an area corresponding to a number of pixel rows and number of pixel columns. When a best focus Z-height $Zp_k$ is determined based on a subregion of interest (e.g., as outlined previously), the point cloud element corresponding to that subregion of interest may be represented by the 3-dimensional coordinates $(X_k, Y_k, Zp_k)$. In various embodiments, the representative locations of the subregions may be spaced apart by several pixels, or as little as one pixel. Thus, in some such embodiments, the pixel areas used to determine a best focus Z-height $Zp_k$ for each subregion may partially overlap one another. In some implementations, the area of each subregion may be relatively small (e.g., 9×9 pixels, 13×7 pixels, 3×3 pixels, 3×5 pixels, etc.). It will be appreciated that using Z-height quality metrics according to select the best image stack for determining a Z-height measurement for a subregion in various embodiments is particularly valuable in association with small focus regions of interest, which tend to produce "focus signals" or focus metrics that may include a relatively large noise component.

In various embodiments, the user may select dedicated multi-point Z-Height Tool or a general purposed Z-Height Tool that includes a multi-point mode by selecting the corresponding "Z-Height Tool" button 740 from a selection bar 707 that displays various alternative tool and/or mode selection buttons. The tool selection bar 707 may indicate that the Z-Height Tool or mode is active via an "active" box 745 around the Z-Height Tool or mode button 740.

Upon such a selection, in one embodiment, the user interface may automatically display a Z-Height Tool parameter dialog box, such as the previously described parameter dialog box 800, as shown in FIG. 13, for selecting a multi-point measuring mode a configuring the various parameters of the selected multi-point measuring mode, as previously disclosed herein. In one embodiment, the widget 1314 may be automatically displayed in the user interface to allow a user to graphically define the region of interest 1314' for that instance of the Z-Height Tool (e.g., by dragging the square handles located on the border of the widget 1314 using a computer mouse and screen cursor). It will be appreciated that the 10×10 subregions shown for the widget 1314 correspond to the particular "Multipoint" parameter settings shown in that tabbed portion 810c in FIG. 13.

Figure 14:
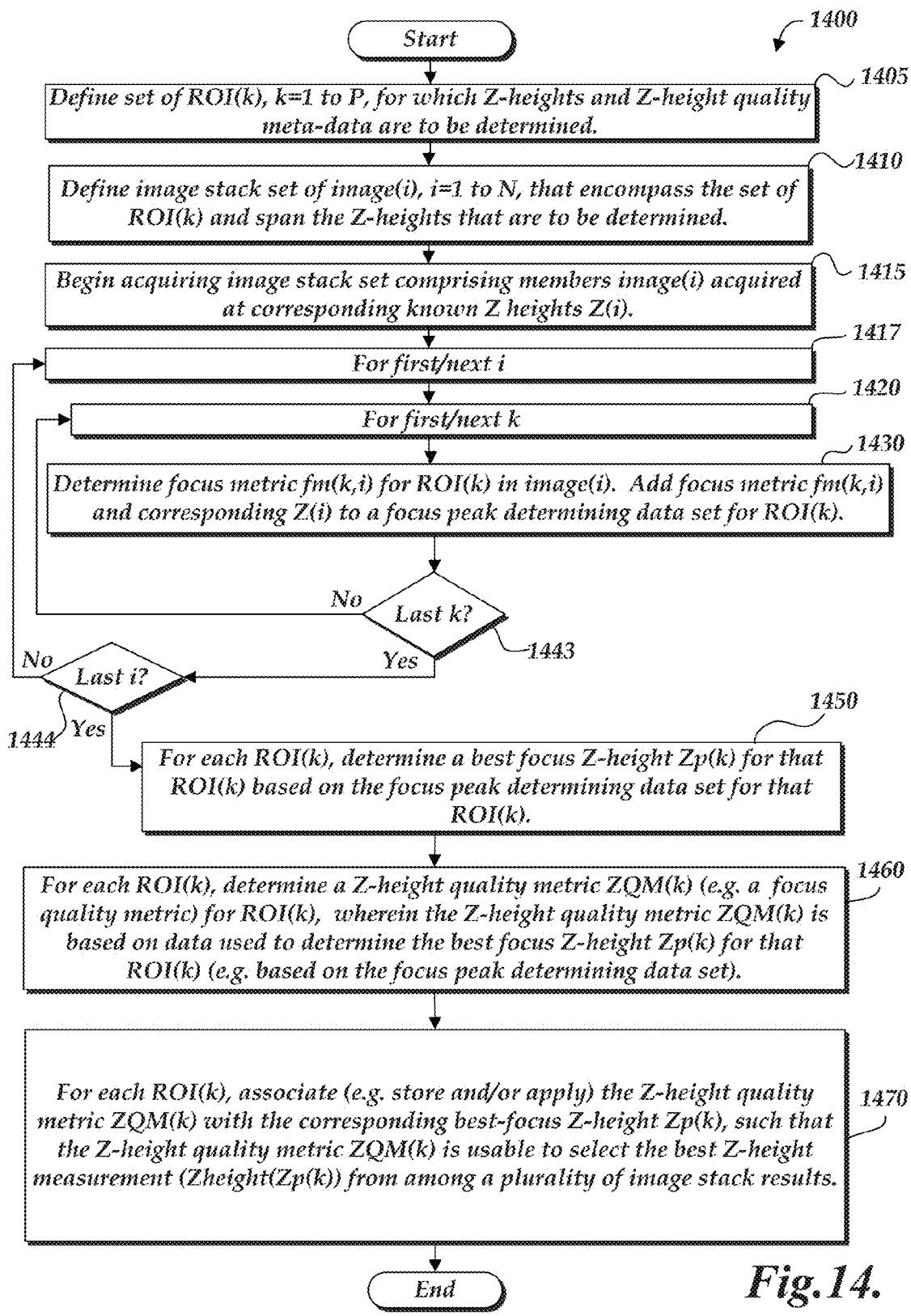
FIG. 14 is a flow diagram illustrative of an exemplary routine which shows one embodiment of operations described in the incorporated the '054 Publication, which may be used to analyze each of a plurality of image stacks analyzed by a multi-point Z-height measurement tool disclosed herein. The Z-height metric shown in the FIG. 14 may be used as a Z-height quality metric in the routines of FIG. 9, or 11.

FIG. 14 is a flow diagram illustrative of an exemplary routine 1400 which shows one embodiment of operations, which may be used to analyze each of a plurality of image stacks analyzed by a multi-point Z-height measurement tool disclosed herein. The "Z-height metric" shown in the FIG. 14 may be used as a Z-height quality metric within in the routines of FIG. 9, or 11, for example. The majority of operations of routine 1400 are described in the incorporated the '054 Publication, which includes a substantially similar figure. Based on the related teachings of the '054 Publication, and teachings elsewhere in this disclosure, one of ordinary skill in the art may understand FIG. 14 by examination.

At a block 1405, a set of regions of interest ROI(k) is defined or selected for k=1 to P, for which Z-heights and corresponding Z-height quality metrics are to be determined. It will be appreciated that in some embodiments each region (or subregion) of interest ROI(k) may be relatively small (e.g., as small as 9×9 pixels, or 7×7 pixels, or even less) and may correspond to an individual coordinate location (e.g., a representative x-y pixel coordinate location) in accordance with the desired goal of providing estimated 3-D coordinate data (point cloud data) to a shape fitting algorithm for fitting a shape to surface region that includes the regions of interest ROI(k).

At a block 1410, an image stack set of images is defined, comprising image(i) for i=1 to N. The field of view of the image stack set may encompass the set of regions of interest ROI(k), and the Z range of the image stack set generally spans the Z-heights that are expected for the set of regions of interest ROI(k). At a block 1415, operations to acquire members of the image stack set image(i), at corresponding Z-heights Z(i), are begun. A Z-height Z(i) is the Z-height indicated by the machine vision inspection system at the time of acquisition of image(i), and corresponds to the location of a focused object plane for that image, regardless of whether or not a workpiece surface is actually located at that focused object plane.

In some embodiments, it may be advantageous to have the operations of other blocks (e.g., the blocks 1417-1443) executed partially in parallel with block 1415, that is, image analysis operations may begin at any convenient time after one or more regions of one or more initial images have been acquired in order to conserve operation time and/or memory. Thus, at a block 1417, a processing loop for image analysis operations on the first/next image(i) may begin at any convenient time after one or more regions or subregions of the first/next image(i) have been acquired.

At a block 1420, a nested processing loop begins for processing operations related to the first/next regions of interest ROI(k), for k=1 to P in the current image(i). At a block 1430, a focus metric fm(k,i) is determined for the current region of interest ROI(k) in the current image(i), and each such focus metric fm(k,i) and corresponding Z-height Z(i) is added to a focus peak determining data set (e.g., a focus curve data set) for the current region of interest ROI(k). At a decision block 1443, a determination is made as to whether there are any more regions of interest ROI(k) to be processed for the current image(i) in the nested processing loop. If so, operation returns to block 1420, otherwise operation continues to a decision block 1444.

At the decision block 1444, a determination is made whether there is another image(i) to be processed in the processing loop begun at block 1417. If so, operation returns to block 1417, otherwise operation continues to a block 550. In the embodiment shown in FIG. 14, operation continues to a block 1450 with a complete focus peak determining data set available for each region of interest ROI(k). However, in other embodiments, the operations of block 1450 may begin for at particular region of interest at any convenient time after a sufficient focus peak determining data set is available for that particular region of interest. At the block 1450, for each region of interest ROI(k) (e.g., for k=1 to P), the best focus Z-height Zp(k) is determined (e.g., estimated as outlined previously) for that ROI(k) based on the focus peak determining data set established by the operations of block 1430 for that ROI(k). In some embodiments, each best focus Z-height Zp(k) may be stored in the memory 140.

Operation then continues to a block 1460 where, for each region of interest ROI(k) (e.g., for k=1 to P), corresponding Z-height quality metric ZQM(k) is determined for that region of interest ROI(k). The Z-height quality metric ZQM(k) may take the form of any convenient Z-height quality metric that indicates the reliability or uncertainty of the corresponding estimated Z-height Zp(k)), based on data used to determine the best focus Z-height Zp(k) for that region of interest ROI (k).

In one embodiment, the Z-height quality metric ZQM(k) may advantageously and conveniently be based on the corresponding peak focus determining data set established by the operations at block 1430 for the region of interest ROI(k) (e.g., as outlined with reference to EQUATION 1, above). However, it will be appreciated that each peak focus determining data set is ultimately based on the underlying image data included in the image stack referred to above. Thus, in various other embodiments, the Z-height quality metric ZQM (k) may be derived from data included in the image stack set for the region of interest ROI(k), or other data derived from that image data. Various methods of determining Z-height quality metric ZQM(k) have been outlined previously (e.g., with reference to EQUATION 1, above).

Operation then continues to a block 1470 where for each ROI(k), the Z-height quality metric ZQM(k) is associated with the corresponding best-focus Z-height Zp(k) for that ROI(k), such that the Z-height quality metric ZQM(k) are usable to select the best Z-height measurement (Zheight(Zp (k)) from among a plurality of image stack results. For example, in some embodiments the Z-height quality metric ZQM(k) is stored in the memory 140 in association with its corresponding best-focus Z-heights Zp(k). The Z-height quality metric ZQM(k) may be stored as meta-data as described in the '054 Publication. In other embodiments, the Z-height quality metric ZQM(k) is transferred or applied directly to surface representation fitting operations (e.g., 2-dimensional "profile" fitting operations or 3-dimensional point cloud fitting operations) in association with their corresponding best-focus Z-heights Zp(k). After block 1470, the routine ends.

While various embodiments have been illustrated and described herein, numerous variations in the illustrated and described arrangements of features and sequences of operations will be apparent to one skilled in the art based on this disclosure. Thus, it will be appreciated that various changes can be made therein without departing from the spirit and scope of the invention.

For example, in various embodiments, the light adjustments that identify lighting parameters that satisfy the various lighting criteria may be accomplished based on operations included in the lighting adjustment tools disclosed in the previously incorporated '180 patent, and in U.S. Pat. No. 6,627,863, (the '863 patent) which is commonly assigned and hereby incorporated herein by reference in its entirety. In another example, the methods described in the incorporated the '054 Publication may be used to analyze each of a plurality of image stacks analyzed by a multi-point Z-height measurement tool disclosed herein, and "Z-height meta-data" determined according to the methods of the '054 Publication may be used as a Z-height quality metric for determining which one of the plurality of image stacks analyzed by a video tool provides the best Z-height quality metric for a subregion, and should be used to determine the focus-based Z-height measurement for that subregion. The teachings of commonly assigned U.S. Pre-Grant Publication No. 2011/0103679 (the '679 Publication), which is hereby incorporated herein by reference in its entirety, may also be adapted to provide methods usable in various embodiments, for example, to provide a global best focus image for a region interest.

It should be appreciated that the methods disclosed herein may be adapted in a straightforward manner for use with a white light interferometer (WLI) measurement tool or method. In one such embodiment, the light levels projected through a WLI element to the workpiece, and the number of image stacks used, are determined according to the teachings disclosed herein. The amplitude of the measured WLI signals (e.g., a normalized WLI peak signal amplitude) may be used in the role of the Z-height quality metric, in some embodiments.

The embodiments of the invention in which an exclusive property or privilege is claimed are defined as follows:

1. A method for operating a precision machine vision inspection system to determine a set of multi-point Z-height measurement data comprising focus-based Z-height measurements in a particular region of interest on a workpiece, the precision machine vision inspection system comprising:
   an imaging portion including a camera;
   a controllable lighting portion;
   a focusing portion;
   a control portion comprising an image processor;
   a first measuring mode for performing multi-point focus-based Z-height measurements on a workpiece, comprising operations that determine the multi-point focus-based Z-height measurements for a plurality of subregions within a region of interest based on a single image stack acquired using the same lighting parameters for each image in that image stack;
   a second measuring mode for performing multi-point focus-based Z-height measurements on a workpiece, comprising operations that determine the multi-point focus-based Z-height measurements for a plurality of subregions within a region of interest based on a plurality of image stacks, wherein a first image stack is acquired using darkness limiting lighting parameters that satisfy a darkness limiting criterion for image pixels in the region of interest and that are the same for each image in the first image stack, and a second image stack is acquired using brightness limiting lighting parameters that satisfy a brightness limiting criterion for image pixels in the region of interest and that are the same for each image in the second image stack;
   a user interface including an image display and a graphical user interface (GUI); and
   a multi-point Z-height measurement tool comprising:
      the second measuring mode;
      the brightness limiting criterion for image pixels in the region of interest;
      the darkness limiting criterion for image pixels in the region of interest; and
      a multi-point GUI element including a region of interest indicator; and
   the method comprising:
      performing operations of the machine vision inspection system comprising:
         acquiring an image of the particular region of interest on a workpiece;
         activating an instance of a multi-point Z-height measurement tool; and
         defining a region of interest in the acquired image;
      performing automatic operations of that instance of the multi-point Z-height measurement tool corresponding to the second measuring mode, comprising:
         (a) operations that automatically focus the imaging portion at a global best focus height for the region of interest, wherein the global best focus height is determined based on an image stack acquired using a preliminary set of lighting parameters and based on a focus metric that is determined based on the entire region of interest;
         (b) operations that analyze images acquired at the global best focus height and adjust the lighting parameters to determine brightness limiting lighting parameters that satisfy the brightness limiting criterion for image pixels in the region of interest, and
         (c) operations that analyze images acquired at the global best focus height and adjust the lighting parameters to determine darkness limiting lighting parameters that satisfy the darkness limiting criterion for image pixels in the region of interest.

2. The method of claim 1, wherein the method comprises performing the operations of the machine vision inspection system under the control of part program instructions during a run mode, and the method further comprises:
   acquiring a plurality of image stacks including the region of interest, that plurality of image stacks comprising at least a first image stack acquired using the determined darkness limiting lighting parameters and a second image stack acquired using the determined brightness limiting lighting parameters; and
   determining the multi-point focus-based Z-height measurements for each of a plurality of subregions within the region of interest based on the plurality of image stacks.

3. The method of claim 2, wherein determining the multi-point focus-based Z-height measurements for each of a plurality of subregions comprises:
   determining a Z-height quality metric for that subregion for each of the plurality of image stacks; and
   determining the focus-based Z-height measurement for that subregion based on the one of the plurality of image stacks that provides the best Z-height quality metric.

4. The method of claim 2, wherein the plurality of image stacks comprises the image stack acquired using the preliminary set of lighting parameters.

5. The method of claim 1, wherein the method comprises performing the operations of the machine vision inspection system during a learn mode, wherein:
   in the step of acquiring an image of the particular region of interest, the workpiece is a representative workpiece and the step comprises displaying the acquired image on the image display;
   the step of activating an instance of a multi-point Z-height measurement tool comprises displaying its multi-point GUI element in the image display; and the step of defining a region of interest in the acquired image comprises defining a region of interest in the displayed image by positioning the region of interest indicator of the multi-point GUI element to surround the particular region of interest.

6. The method of claim 5, wherein the method further comprises recording part program instructions for that instance of the multi-point Z-height measurement tool that perform operations comprising:
acquiring a plurality of image stacks including the region of interest, that plurality of image stacks comprising at least a first image stack acquired using the determined darkness limiting lighting parameters and a second image stack acquired using the determined brightness limiting lighting parameters; and
determining the multi-point focus-based Z-height measurements for each of a plurality of subregions within the region of interest based on the plurality of image stacks, comprising for each subregion:
determining a Z-height quality metric for that subregion for each of the plurality of image stacks; and
determining the focus-based Z-height measurement for that subregion based on the one of the plurality of image stacks that provides the best Z-height quality metric.

7. The method of claim 6, wherein the Z-height quality metric comprises a relationship between a representative peak height indicated by a focus peak determining data set derived from the plurality of image stacks, and a representative noise level or "noise height" indicated by the focus peak determining data set.

8. A method for operating a precision machine vision inspection system to determine a set of Z-height measurement data comprising focus-based Z-height measurements on a workpiece, the precision machine vision inspection system comprising a user interface, an imaging portion including a camera, a controllable lighting portion, a focusing portion, and a control portion comprising an image processor, the method comprising:
(a) operating the precision machine vision inspection system to define a region of interest for performing points-from-focus operations on the workpiece;
(b) operating the precision machine vision inspection system to define N respective lighting vectors associated with N image stacks comprising images including the region of interest and having different focus Z-heights in a defined Z-height range, where N is at least 2, and defining the N respective lighting vectors comprises;
(b1) defining a first respective lighting vector such that a first brightness criterion is satisfied wherein the brightest pixel locations in the region of interest include brightness values in the upper 25% of a brightness range of the camera, and such that a first number of the brightest pixel locations in the region of interest which have brightness values at or above an upper brightness limit is limited to a first small proportion of the pixel locations in the region of interest, as determined in at least a first image having a respective focus Z-height in the Z-height range and having an image exposure level corresponding to the first respective lighting vector; and
(b2) defining a second respective lighting vector such that a second brightness criterion is satisfied wherein a second number of the darkest pixel locations in the region of interest which have brightness values at or below a lower brightness limit is limited to a second small proportion of the pixel locations in the region of interest, as determined in at least a second image having a respective focus Z-height in the Z-height range and having an image exposure level corresponding to the second respective lighting vector; and
(c) performing at least one of the sets of operations (c1) and (c2), wherein:
(c1) comprises:
storing the N respective lighting vectors in association with a part program for later use when inspecting a corresponding region of interest on a corresponding workpiece, wherein the part program includes instructions for performing operations comprising:
acquiring N image stacks based on the N respective lighting vectors;
determining which of the N image stacks has the best Z-height quality metric at each points-from-focus data point location; and
providing Z-height measurements data derived from the image stacks such that at each points-from-focus data point location the Z-height measurement associated with the image stack having the best Z-height quality metric is identified as the Z-height measurement at that points-from-focus data point location, and
(c2) comprises:
operating the precision machine vision inspection system to acquire N image stacks based on the N respective lighting vectors;
determining which of the N image stacks has the best Z-height quality metric at each points-from-focus data point location; and
providing Z-height measurement data derived from the image stacks such that at each points-from-focus data point location the Z-height measurement is based on the image stack having the best Z-height quality metric at that points-from-focus data point location.

9. The method of claim 8, wherein:
in step (b1) the first number of the brightest pixel locations in the region of interest which have brightness values at or above an upper brightness limit is limited to a first small proportion of the pixel locations in the region of interest, as determined in a first plurality of images having respective focus Z-heights in the Z-height range and having an image exposure level corresponding to the first respective lighting vector; and
in step (b2) the second number of the darkest pixel locations in the region of interest which have brightness values at or below a lower brightness limit is limited to a second small proportion of the pixel locations in the region of interest, as determined in a second plurality of images having respective focus Z-heights in the Z-height range and having an image exposure level corresponding to the second respective lighting vector.

10. The method of claim 8, wherein in step (b1) the at least a first image consists of the first image and in step (b2) the at least a second image consists of the second image.

11. The method of claim 10, wherein the respective focus Z-heights of the first and second images are different.

12. The method of claim 10, wherein the respective focus Z-heights of the first and second images are the same.

13. The method of claim 8, wherein step (b) comprises performing operations including:
defining the Z-height range;
acquiring a preliminary image stack comprising a plurality of images at a plurality of corresponding focus Z-heights in the Z-height range using a preliminary lighting vector;

determining a peak focus Z-height based on the preliminary image stack; and using that peak focus Z-height as the respective focus Z-height of the first and second images.

14. The method of claim 13, wherein:

defining the first respective lighting vector comprises iteratively analyzing respective images acquired at the peak focus Z-height using respective lighting vectors until at least a first respective image is identified that satisfies the first brightness criterion, and using the respective lighting vector corresponding to that at least a first respective image as the first respective lighting vector; and defining the second respective lighting vector comprises iteratively analyzing respective images acquired at the peak focus Z-height using respective light vectors until at least a second respective image is identified that satisfies the second brightness criterion, and using the respective lighting vector corresponding to that at least a second respective image as the second respective lighting vector.

15. The method of claim 8, comprising performing the operations of step (c2) in association with a run mode of operation of the precision machine vision inspection system, which is governed by a part program.

16. The method of claim 15, wherein:

in step (c2) during the run mode of operation, operating the precision machine vision inspection system to acquire N image stacks based on the N respective lighting vectors comprises:

recalling a Z-height range from the part program;

recalling the N respective lighting vectors from the part program; and using the recalled Z-height range and N respective lighting vectors to acquire the N image stacks.

17. The method of claim 15, wherein:

in step (c2) during the run mode of operation, operating the precision machine vision inspection system to acquire N image stacks based on the N respective lighting vectors comprises:

recalling a Z-height range from the part program;

acquiring a preliminary image stack comprising a plurality of images at a plurality of corresponding focus Z-heights in the Z-height range;

determining a peak focus Z-height based on the preliminary image stack;

using that peak focus Z-height as a run mode focus Z-height for the first and second representative images; and using the N respective lighting vectors to acquire the N image stacks.

18. The method of claim 8, wherein the Z-height quality metric comprises a relationship between a representative peak height indicated by a focus peak determining data set derived from the plurality of image stacks, and a representative noise level or noise height indicated by the focus peak determining data set.

19. The method of claim 18, wherein the Z-height quality metric is based on a set of focus curve data comprising contrast values vs. Z-heights for each X-Y location in a respective stack of workpiece images, using a maximum contrast value MAX, a baseline contrast value BAS which is the median of all of the contrast values in the respective contrast curve and the median of the absolute deviation of the difference between the ith contrast values Ci of the contrast curve and the baseline contrast value BAS, according to the equation $$Q = \frac{(MAX - BAS)}{\text{Median}\{|Ci - BAS|\}}.$$

* * * * *